US012668676B2

(12) United States Patent
Poeselt et al.

(10) Patent No.: US 12,668,676 B2
(45) Date of Patent: Jun. 30, 2026

(54) PARTICLE FOAMS

(71) Applicants: BASF SE, Ludwigshafen am Rhein (DE); BASF Polyurethanes GmbH, Lemfoerde (DE)

(72) Inventors: Elmar Poeselt, Lemfoerde (DE); Uwe Keppeler, Ludwigshafen am Rhein (DE); Christina Tepper, Lemfoerde (DE); Frank Prissok, Lemfoerde (DE); Dirk Kempfert, Lemfoerde (DE); Lisa Marie Schmidt, Lemfoerde (DE); Wolfgang Guenter Micklitz, Neustadt (DE)

(73) Assignee: BASF SE, Ludwigshafen am Rhein (DE)

( * ) Notice: Subject to any disclaimer, the term of this patent is extended or adjusted under 35 U.S.C. 154(b) by 971 days.

(21) Appl. No.: 17/596,435

(22) PCT Filed: Jun. 12, 2020

(86) PCT No.: PCT/EP2020/066297
§ 371 (c)(1),
(2) Date: Dec. 10, 2021

(87) PCT Pub. No.: WO2020/249727
PCT Pub. Date: Dec. 17, 2020

(65) Prior Publication Data
US 2022/0267553 A1     Aug. 25, 2022

(30) Foreign Application Priority Data

Jun. 14, 2019   (EP) ..................................... 19180321

(51) Int. Cl.
| | |
|---|---|
| *C08J 9/35* | (2006.01) |
| *C08G 18/10* | (2006.01) |
| *C08G 18/48* | (2006.01) |
| *C08G 18/76* | (2006.01) |
| *C08J 9/00* | (2006.01) |
| *C08J 9/14* | (2006.01) |
| *C08J 9/228* | (2006.01) |
| *B29C 44/44* | (2006.01) |
| *B29K 75/00* | (2006.01) |
| *B29K 105/00* | (2006.01) |
| *B29K 105/04* | (2006.01) |

(52) U.S. Cl.
CPC ............... *C08J 9/35* (2013.01); *C08G 18/10* (2013.01); *C08G 18/4858* (2013.01); *C08G 18/7678* (2013.01); *C08J 9/0061* (2013.01); *C08J 9/141* (2013.01); *C08J 9/228* (2013.01); *B29C 44/445* (2013.01); *B29K 2075/00* (2013.01); *B29K 2105/04* (2013.01); *B29K 2105/251* (2013.01); *C08J 2203/14* (2013.01); *C08J 2375/08* (2013.01)

(58) Field of Classification Search
CPC .............. B29C 44/445; B29K 2075/00; B29K 2105/04; B29K 2105/251; C08G 18/10; C08G 18/4244; C08G 18/4277; C08G 18/4854; C08G 18/4858; C08G 18/664; C08G 18/76; C08G 18/7657; C08G 18/7678; C08G 2101/00; C08G 2110/0058; C08J 9/0061; C08J 9/141; C08J 9/16; C08J 9/18; C08J 9/228; C08J 9/232; C08J 9/236; C08J 9/35; C08J 2201/03; C08J 2203/14; C08J 2207/00; C08J 2375/06; C08J 2375/08; C08K 2003/265; E01C 13/045; E01C 13/065; E04F 13/18
See application file for complete search history.

(56) References Cited

U.S. PATENT DOCUMENTS

| | | |
|---|---|---|
| 9,884,947 B2 | 2/2018 | Prissok et al. |
| 10,005,218 B2 | 6/2018 | Rudolph et al. |
| 11,161,956 B2 | 11/2021 | Prissok et al. |

(Continued)

FOREIGN PATENT DOCUMENTS

| | | |
|---|---|---|
| EP | 1 979 401 | 9/2010 |
| EP | 3 053 732 | 8/2016 |

(Continued)

OTHER PUBLICATIONS

English Translation of WO2018/092744 (Year: 2018).*
International Preliminary Report On Patentability issued Dec. 16, 2021 in PCT/EP2020/066297, 9 pages.
International Search Report issued Sep. 3, 2020 in PCT/EP2020/066297, with English translation, 7 pages.
"Kunststoffhandbuch [Plastics Handbook], vol. 7, Polyurethane [Polyurethanes]", Carl Hanser Verlag, 3rd edition 1993, chapter 3.1.
"Kunststoffhandbuch, vol. 7, Polyurethane", Carl Hanser Verlag, 3rd edition 1993, chapter 3.

(Continued)

*Primary Examiner* — John M Cooney
(74) *Attorney, Agent, or Firm* — Grüneberg Global IP, PLLC

(57) ABSTRACT

A process can be used for producing a thermoplastic polyurethane, where the process at least involves converting at least one isocyanate composition and a polyol composition, to obtain a prepolymer having isocyanate groups, and reacting the resulting prepolymer with at least one chain extender. The at least one isocyanate composition contains an isocyanate selected from naphthylene 1,5-diisocyanate (NDI), diphenylmethane 4,4'-diisocyanate (MDI), p-phenyl diisocyanate (PPDI), o-tolidine diisocyanate (TODI), ethylene diphenyl diisocyanate (EDI), or mixtures thereof. The polyol composition contains a polytetrahydrofuran or a derivative thereof. A thermoplastic polyurethane obtained or obtainable by such a process is useful, and a foamed pellet material can be produced containing such a thermoplastic polyurethane. The foamed pellet material of the invention can be used for production of a molded article.

16 Claims, No Drawings

(56)                    References Cited

U.S. PATENT DOCUMENTS

| | | | |
|---|---|---|---|
| 11,214,649 B2 | 1/2022 | Hollmann et al. | |
| 2005/0092424 A1 | 5/2005 | Zhang et al. | |
| 2007/0088146 A1 | 4/2007 | Nakamura et al. | |
| 2008/0064844 A1* | 3/2008 | Nagaraj | C08G 18/4277 |
| | | | 528/59 |
| 2015/0252163 A1* | 9/2015 | Prissok | C08G 18/664 |
| | | | 521/174 |
| 2015/0337102 A1 | 11/2015 | Schiller et al. | |
| 2018/0100049 A1 | 4/2018 | Prissok et al. | |
| 2019/0211136 A1* | 7/2019 | Hasegawa | C08G 18/757 |
| 2019/0270841 A1 | 9/2019 | Poppenberg et al. | |
| 2019/0276582 A1 | 9/2019 | Poppenberg et al. | |

FOREIGN PATENT DOCUMENTS

| | | |
|---|---|---|
| EP | 2 872 309 | 11/2017 |
| WO | 94/20568 | 9/1994 |
| WO | 2007/082838 | 7/2007 |
| WO | 2010/010010 | 1/2010 |
| WO | 2013/153190 | 10/2013 |
| WO | 2014/150122 | 9/2014 |
| WO | 2014/150124 | 9/2014 |
| WO | 2016/146537 | 9/2016 |
| WO | 2017/030835 | 2/2017 |
| WO | 2018/087385 | 5/2018 |
| WO | 2018/092744 | 5/2018 |
| WO | WO-2018/087387 A1 | 5/2018 |
| WO | 2018/149977 | 8/2018 |

OTHER PUBLICATIONS

Saechtling (ed.), Kunststoff-Taschenbuch, 27th edition, Hanser-Verlag, Munich 1998, chapters 3.2.1 and 3.2.4.
Written Opinion issued Sep. 3, 2020 in PCT/EP2020/066297, 8 pages.

* cited by examiner

PARTICLE FOAMS

CROSS-REFERENCE TO RELATED APPLICATIONS

This application is the National Stage entry under § 371 of International Application No. PCT/EP2020/066297, filed on Jun. 12, 2020, and which claims the benefit of priority to European Application No. 19180321.2, filed on Jun. 14, 2019. The content of each of these applications is hereby incorporated by reference in its entirety.

BACKGROUND OF THE INVENTION

Field of the Invention

The present invention relates to a process for producing a thermoplastic polyurethane, at least comprising the converting of at least one isocyanate composition (ZI) comprising an isocyanate (I1) selected from the group consisting of naphthylene 1,5-diisocyanate (NDI), diphenylmethane 4,4'-diisocyanate (MDI), p-phenyl diisocyanate (PPDI) and o-tolidine diisocyanate (TODI), ethylene diphenyl diisocyanate (EDI) or mixtures thereof and a polyol composition (ZP) comprising a polytetrahydrofuran or a derivative thereof to obtain a prepolymer having isocyanate groups, and the reacting of the resulting prepolymer with at least one chain extender (KV). The present invention further relates to a thermoplastic polyurethane obtained or obtainable by such a process, and to a foamed pellet material comprising such a thermoplastic polyurethane. The present invention further encompasses the use of a foamed pellet material of the invention for production of a molded article.

Description of Related Art

Thermoplastic polyurethanes are known per se. According to the desired profiles of properties, the isocyanates, polyols and chain extenders used may be varied. Foamed pellet materials, which are also referred to as bead foams (or particle foams), and also molded articles produced from them, based on thermoplastic polyurethane or other elastomers, are known per se (e.g. WO 94/20568, WO 2007/082838 A1, WO2017030835, WO 2013/153190 A1, WO2010010010) and have manifold possible uses.

SUMMARY OF THE INVENTION

For the purposes of the present invention, "a foamed pellet material" or else a "bead foam" or "particle foam" refers to a foam in bead form, where the average diameter of the beads is typically from 0.2 to 20 mm, preferably 0.5 to 15 mm and especially from 1 to 12 mm. In the case of non-spherical, e.g. elongate or cylindrical, beads, diameter means the longest dimension.

In principle, there is a need for thermoplastic polyurethanes, especially for foamed pellet materials or bead foams, which have improved processibility to give the corresponding molded articles at minimum temperatures while maintaining advantageous mechanical properties. This is especially relevant for the fusion processes currently in widespread use, in which the input of energy for fusing the foamed pellets is introduced by an auxiliary medium, for example steam, since improved bonding is achieved here and damage to the material or foam structure is thus simultaneously reduced and at the same time sufficient bonding or fusion is obtained.

Sufficient bonding or fusion of the foamed pellets is essential in order to obtain advantageous mechanical properties of the molding produced from the foamed pellets. If bonding or fusion of the foam beads is inadequate, their properties cannot be fully utilized, and there is a resultant negative effect on the overall mechanical properties of the molding obtained. Similar considerations apply when the molded article has been weakened. In such cases, the mechanical properties are disadvantageous at the weakened points, the result being the same as mentioned above. The properties of the polymer used therefore have to be efficiently adjustable.

Known materials frequently have a very low modulus of elasticity at room temperature, such that high densities have to be achieved for many applications in order that adequate stiffness or stability is attained. At the same time, for many applications, high resilience and good mechanical properties are to be achieved, and the materials are to have good weldability for production of moldings from the foamed pellet material.

DETAILED DESCRIPTION OF THE INVENTION

Within the context of the present invention, "advantageous mechanical properties" are to be interpreted with respect to the intended applications. The most prominent application for the subject matter of the present invention is the application in the footwear sector, where the foamed pellets can be used for molded articles for constituent parts of footwear in which damping and/or cushioning is relevant, for example intermediate soles and insoles.

It was thus an object of the present invention to provide thermoplastic polyurethanes and foamed pellet materials based on thermoplastic polyurethanes that have sufficient stiffness but simultaneously good mechanical properties and have good processibility. It was a further object of the present invention to provide a process for producing the corresponding thermoplastic polyurethanes and foamed pellet materials.

This object is achieved in accordance with the invention by a process for producing a thermoplastic polyurethane, at least comprising steps (i) and (ii):

(i) converting at least one isocyanate composition (ZI) comprising an isocyanate (I1) selected from the group consisting of naphthylene 1,5-diisocyanate (NDI), diphenylmethane 4,4'-diisocyanate (MDI), p-phenyl diisocyanate (PPDI) and o-tolidine diisocyanate (TODI), ethylene diphenyl diisocyanate (EDI) or mixtures thereof and a polyol composition (ZR) comprising a polytetrahydrofuran or a derivative thereof to obtain a prepolymer having isocyanate groups, (ii) reacting the prepolymer obtained in step (i) with at least one chain extender (KV).

The invention further relates to a thermoplastic polyurethane obtainable or obtained by a process of the invention.

It has been found that, surprisingly, the use of the components used in accordance with the invention and especially of the specific combination of the isocyanate used (IZ) with a specific polyol component can give thermoplastic polyurethanes and foamed pellet materials produced therefrom that have a high modulus of elasticity and simultaneously a low softening point, such that the foamed pellet materials have good processibility to give shaped articles and simultaneously show a low Tg of the soft phase. Moreover, the foamed pellet materials of the invention feature good mechanical properties, for example high elasticity and good resilience. Dynamic sustained use properties are also very good. It was surprisingly possible in accordance with the invention to achieve very good phase separation with simultaneously better melt ability of the hard phase, such that a harder, and simultaneously efficiently processable, foamed pellet material was obtained. More particularly, it was thus possible to distinctly improve compression hardness over conventional materials. Furthermore, the thermoplastic polyurethanes of the invention and foamed pellet materials produced therefrom have very good low-temperature properties and good thermal stability.

Within the context of the present invention, unless stated otherwise, rebound is determined analogously to DIN 53512, April 2000; the departure from the standard is the test specimen height, which should be 12 mm, but this test is conducted with 20 mm in order to avoid "penetration" of the sample and measurement of the substrate determines, unless stated otherwise.

It has been found that, surprisingly, the thermoplastic polyurethanes of the invention have good processibility to give a foamed pellet material that can in turn be further processed efficiently to give molded articles which especially have a high modulus of elasticity and very good resilience.

The process of the invention comprises steps (i) and (ii). In step (i), the isocyanate composition (ZI) comprising an isocyanate (I1) selected from the group consisting of naphthylene 1,5-diisocyanate (NDI), diphenylmethane 4,4'-diisocyanate (MDI), p-phenyl diisocyanate (RPDI) and o-tolidine diisocyanate (TODI), ethylene diphenyl diisocyanate (EDI) or mixtures thereof and a polyol composition (ZP) comprising a polytetrahydrofuran or a derivative thereof is converted to obtain a prepolymer having isocyanate groups. In step (ii), the prepolymer obtained in step (i) is reacted with at least one chain extender (KV). According to the invention, step (ii) can be performed after step (i). However, it is also possible to conduct both steps in one stage of the process.

In step (i), the isocyanate composition (ZI) is reacted with the polyol composition (ZP) comprising a polytetrahydrofuran or a derivative thereof. According to the invention, the polyol composition (ZP) comprises at least one polytetrahydrofuran or a derivative thereof and may comprise further components, especially further substances reactive toward isocyanates, for example further polyols. According to the invention, the polyol composition may also comprise mixtures of different polytetrahydrofurans having different average molecular weight or mixtures of a polytetrahydrofuran with one or more derivatives thereof.

In a particularly preferred embodiment, the polytetrahydrofuran has a number-average molecular weight Mn in the range from 500 g/mol to 5000 g/mol, further preferably in the range from 550 to 2500 g/mol, especially preferably in the range from 650 to 2000 g/mol. In a further embodiment, the number-average molecular weight Mn of the polytetrahydrofuran is in the range from 500 to 1400 g/mol.

Mixtures of various polytetrahydrofurans can also be used in accordance with the invention, that is to say mixtures of polytetrahydrofurans having different molecular weights. According to the invention, it is also possible that the polyol composition comprises further polyols. Suitable polyols are known per se to those skilled in the art. Suitable examples are polyethers, polyesters or polycarbonates.

In the context of the present invention, polytetrahydrofurans are also referred to as α-hydro-ω-hydroxypoly(oxytetramethylene)diols.

According to the invention, the polyol composition comprises a polytetrahydrofuran or a derivative thereof. In the context of the present invention, a derivative is also understood to mean, for example, a reaction product of polytetrahydrofuran. Suitable derivatives are, for example, also those that are obtained by reaction of the free hydroxyl groups of the polytetrahydrofuran. Suitable derivatives are, for example, poly-ε-caprolactonepolyols, i.e. polyols that are obtained by reaction of ε-caprolactone and a polytetrahydrofuran as starter molecule.

In a further embodiment, the present invention also relates to a process as described above, wherein the poly-ε-caprolactonepolyol used is obtainable or obtained by reaction of ε-caprolactone and a starter molecule selected from the group consisting of α-hydro-ω-hydroxypoly(oxytetramethylene)diols.

According to the invention, the polyol composition may also comprise further poly-ε-caprolactonepolyols, especially those having a number-average molecular weight in the range from 500 to 5000 g/mol, preferably in the range from 1000 to 5000 g/mol, further preferably in the range from 1500 to 2500 g/mol. Preference is given to using poly-ε-caprolactonediols, i.e. those poly-ε-caprolactonepolyols that are obtained or obtainable using a difunctional starter. Starters suitable in the context of the present invention are, for example, diols having a number-average molecular weight in the range from 80 to 1500 g/mol, for example polyether polyols or polyester polyols. Polyether polyols are especially suitable.

In a further embodiment, the present invention therefore also relates to a process as described above, wherein the poly-ε-caprolactonepolyol used is obtainable or obtained by reaction of ε-caprolactone and a starter molecule selected from the group consisting of diols having a number-average molecular weight in the range from 50 to 1500 g/mol, preferably from 80 to 2500 g/mol, further preferably in the range from 80 to 1500 g/mol.

Suitable starter molecules are especially selected from the group consisting of neopentyl glycol (NPG), butane-1,4-diol (BDO), hexane-1,6-diol (HDO) and long-chain polyether diols having a number-average molecular weight in the range from 500 to 1500 g/mol, preferably in the range from 800 to 1200 g/mol, further preferably 900 to 1100 g/mol.

In the context of the present invention, the number-average molecular weights, unless stated otherwise, are obtained by determining the OH number. Suitable measurement conditions are known to the person skilled in the art.

In a further embodiment, the present invention also relates to a process as described above, wherein the poly-ε-caprolactonepolyol used is obtainable or obtained by reaction of ε-caprolactone and a starter molecule selected from the group consisting of α-hydro-ω-hydroxypoly(oxytetramethylene)diols, polyethylene glycols and polypropylene glycols, preferably from the group consisting of α-hydro-ω-hydroxypoly(oxytetramethylene)diols having a number-average molecular weight in the range from 150 to 1500 g/mol, polyethylene glycols having a number-average molecular weight in the range from 150 to 1500 g/mol and polypropylene glycols having a number-average molecular weight in the range from 150 to 1500 g/mol.

The polyol composition (ZP) may comprise, as a further isocyanate-reactive compound, a further α-hydro-ω-hydroxypoly(oxytetramethylene)polyol. Suitable α-hydro-ω-hydroxypoly(oxytetramethylene)polyols are known per se. Suitable in the context of the present invention are preferably hydro-ω-hydroxypoly(oxytetramethylene)polyols having a number-average molecular weight in the range from 1000 to 5000 g/mol, preferably in the range from 1500 to 2500 g/mol. In the context of the present invention, it is also possible to use mixtures of two or more hydro-ω-hydroxy-poly(oxytetramethylene)polyols having different molecular weight.

In a further embodiment, the present invention accordingly also relates to a process as described above, wherein the derivative of polytetrahydrofuran is a poly-ε-caprolactonepolyol.

The composition of the polyol composition (ZR) may vary within wide ranges. Preferably, in the context of the present invention, the proportion of the α-hydro-ω-hydroxy-poly(oxytetramethylene)polyol in the polyol composition (ZP) is in the range from 0.1% to 50% by weight, preferably in the range from 10% to 35% by weight, more preferably in the range from 15% to 25% by weight. In a preferred embodiment, the polyol composition (ZP) consists of the poly-ε-caprolactonepolyol and the α-hydro-ω-hydroxypoly(oxytetramethylene)polyol.

In a further embodiment, the present invention also relates to a process as described above, wherein the polyol composition comprises the α-hydro-ω-hydroxypoly(oxytetramethylene)polyol in an amount of 0.1% to 50% by weight, based on the polyol composition.

In a further embodiment, the present invention also relates to a process as described above, wherein the poly-ε-caprolactonepolyol and/or the α-hydro-ω-hydroxypoly(oxytetramethylene)polyol have a number-average molecular weight in the range from 1500 to 2500 g/mol.

For example, the number-average molecular weight of the two polyols in the mixture of poly-ε-caprolactonepolyols and α-hydro-ω-hydroxypoly(oxytetramethylene)polyols is about 2000 g/mol.

Unless stated otherwise, the number-average molecular weights Mn in the context of the present invention are determined by GPC.

The process of the invention can also be conducted in such a way that, in the reaction in step (i), the polyol component (ZP) comprises further polyols as well as the polytetrahydrofuran and derivatives thereof. Suitable polyols are known in principle to those skilled in the art and described for example in "Kunststoffhandbuch [Plastics Handbook], volume 7, Polyurethane [Polyurethanes]", Carl Hanser Verlag, 3rd edition 1993, chapter 3.1. Particular preference is given to using, as polyol (P1), polyesterols or polyetherols as polyols. It is likewise possible to use polycarbonates. Copolymers may also be used in the context of the present invention.

Polyetherols, but also polyesterols, block copolymers and hybrid polyols such as for example poly(ester/amide), are suitable in accordance with the invention. According to the invention, preferred polyetherols are polyethylene glycols, polypropylene glycols, polyadipates, polycarbonates, polycarbonate dials and polycaprolactone.

The polyols/the polyol composition used preferably have/has an average functionality of between 1.8 and 2.3, preferably between 1.9 and 2.2, in particular 2. The polyols used in accordance with the invention preferably have solely primary hydroxyl groups.

According to the invention, it may be advantageous when no water is used in the reaction in step (i) or in the reaction in step (ii) or in the reaction in step (i) and the reaction in step (ii). In one embodiment of the present invention, it is accordingly possible to use a polyol component comprising less than 100 ppm of water.

According to the invention, the reaction in step (i) can be effected, for example, at a temperature in the range from 110 to 180° C., preferably in the range from 130 to 170° C. and more preferably 140 to 155° C. to give a prepolymer having isocyanate groups.

The isocyanate-terminated prepolymer thus obtained according to the invention preferably has an NCO content of 2% to 20% by weight, more preferably 2% to 10% by weight and especially 2% to 5% by weight. The prepolymer obtained, depending on the NCO content, generally has a viscosity between 800-5000 mPas at 80° C., measured with a rotary viscometer.

Preference is given to preparing the isocyanate-terminated prepolymer by using at least 50% by weight, more preferably at least 80% by weight, even more preferably at least 90% by weight and especially 100% by weight of the polyol component. It is also possible in the context of the present invention that further polyols are used in the reaction in step (ii).

In the context of the present invention, the composition of the polyol composition (PZ) can vary within wide ranges. According to the invention, the polyol composition may also comprise a solvent. Suitable solvents are known per se to those skilled in the art.

In a further embodiment, the present invention accordingly also relates to a process as described above, wherein further components used in the reaction in step (ii) are selected from the group consisting of polyols, chain extenders, catalysts, cell nucleators, other auxiliaries and additives.

In step (i), the isocyanate composition (ZI) is additionally used. According to the invention, the isocyanate composition (ZI) comprises an isocyanate (I1) selected from the group consisting of naphthylene 1,5-diisocyanate (NDI), diphenylmethane 4,4'-diisocyanate (MDI), p-phenyl diisocyanate (PPDI) and o-tolidine diisocyanate (TODI), ethylene diphenyl diisocyanate (EDI) or mixtures thereof. According to the invention, the isocyanate composition (ZI) may also comprise further isocyanates. Preferably, the isocyanate composition (ZI) comprises an isocyanate (I1) selected from the group consisting of naphthylene 1,5-diisocyanate (NDI), p-phenyl diisocyanate (PPDI) and o-tolidine diisocyanate (TODI), ethylene diphenyl diisocyanate (EDI) or mixtures thereof. Further preferably, the isocyanate composition (ZI) comprises naphthylene 1,5-diisocyanate (NDI) as isocyanate (I1).

It has been found that, especially in the case of use of naphthylene 1,5-diisocyanate (NDI) or isocyanate mixtures comprising, naphthylene 1,5-diisocyanate (NDI) and a further isocyanate, thermoplastic polyurethanes having advantageous properties are obtained. According to the invention, it is possible, for example, also to use mixtures comprising naphthylene 1,5-diisocyanate (NDI) and diphenylmethane 4,4'-diisocyanate (MDI). Suitable mixtures may comprise naphthylene diisocyanate (NDI) and diphenylmethane 4,4'-diisocyanate (MDI), for example, in a ratio in the range from 50:50 to 30:70.

Suitable further isocyanates in the context of the present invention are especially diisocyanates, especially aliphatic or aromatic diisocyanates, more preferably aromatic diisocyanates.

In addition, within the context of the present invention, pre-reacted products in which some of the OH components are reacted with an isocyanate in a preceding reaction step may be used as isocyanate component. The products obtained are reacted with the remaining OH components in a subsequent step, the actual polymer reaction, thus forming the thermoplastic polyurethane.

If further isocyanates are used, these are present in the isocyanate composition (ZI) preferably in an amount in the range from 0.1% to 20% by weight, further preferably in the range from 0.1% to 10% by weight and especially preferably in an amount in the range from 0.5% to 5% by weight.

The polyisocyanate composition may also comprise one or more solvents. Suitable solvents are known to those skilled in the art. Suitable examples are nonreactive solvents such as ethyl acetate, methyl ethyl ketone and hydrocarbons.

In a further embodiment, the present invention accordingly also relates to a process as described above, wherein the polyisocyanate composition comprises an isocyanate selected from the group consisting of naphthylene 1,5-diisocyanate (NDI), diphenylmethane 4,4'-diisocyanate (MDI), p-phenyl diisocyanate (PPDI) and o-tolidine diisocyanate (TODI), ethylene diphenyl diisocyanate (EDI) or mixtures thereof in an amount within a range from 90% to 100% by weight, based on the overall polyisocyanate composition.

In a further embodiment, the present invention accordingly also relates to a process as described above, wherein the polyisocyanate composition comprises naphthylene 1,5-diisocyanate (NDI) in an amount within a range from 90% to 100% by weight, based on the overall polyisocyanate composition.

In step (ii), the prepolymer obtained in step (i) is reacted with at least one chain extender (KV). The prepolymer obtained is preferably reacted in step (ii) with the chain extender (KV), with optional addition of further polyols or further chain extenders and optionally catalyst, optionally blowing agent and/or crosslinker and optionally auxiliaries and/or additives, if they have not already been added or only partly added in the first step. In one embodiment of the present invention, the chain extender used comprises less than 100 ppm of water.

According to the invention, the prepolymer obtained in step (i) is preferably reacted in step (ii) in such amounts that, in this step, the equivalence ratio of NCO groups to the sum total of the reactive hydrogen atoms is 0.8:1 to 1.5:1, preferably 0.85:1 to 1.3:1 and especially 1.02:1 to 1.15:1. A ratio of 1:1 corresponds to an isocyanate index of 100. In the context of the present invention, the isocyanate index is understood to mean the stoichiometric ratio of isocyanate groups to isocyanate-reactive groups multiplied by 100.

Suitable chain extenders are known per se to those skilled in the art. Chain extenders are, for example, compounds having two groups reactive toward isocyanate groups, especially those having a molecular weight of less than 500 g/mol. Suitable chain extenders are, for example, diamines or diols. According to the invention, further preference is given to diols. In the context of the present invention, it is also possible to use mixtures of two or more chain extenders.

In a further embodiment, the present invention accordingly also relates to a process as described above, wherein the chain extender (KV) is selected from the group consisting of diols having a molecular weight in the range from 50 to 500 g/mol and diamines having a molecular weight in the range from 50 to 500 g/mol.

It is possible here in accordance with the invention to use, for example, aliphatic, araliphatic, aromatic and/or cycloaliphatic diols having a molecular weight of 50 g/mol to 220 g/mol as chain extender. Preference is given to alkanediols having 2 to 10 carbon atoms in the alkylene radical, especially di-, tri-, tetra-, penta-, hexa-, hepta-, octa-, nona- and/or decaalkylene glycols. For the present invention, particular preference is given to MEG, butane-1,4-diol, propane-1,3-diol and hexane-1,6-diol.

Suitable chain extenders (KV) in the context of the present invention are also branched compounds such as cyclohexyl-1,4-dimethanol, 2-butyl-2-ethylpropanediol, neopentyl glycol, 2,2,4-trimethylpentane-1,3-diol, pinacol, 2-ethylhexane-1,3-diol or cyclohexane-1,4-diol.

In a further embodiment, the present invention accordingly also relates to a process as described above, wherein the chain extender (KV) is selected from the group consisting of MEG, butane-1,4-diol, propane-1,3-diol, hexane-1,6-diol, 2-ethylhexane-1,3-diol or 2-butyl-2-ethylpropanediol. It is also possible in accordance with the invention that mixtures of two or more chain extenders selected from the group consisting of MEG, butane-1,4-diol, propane-1,3-diol, hexane-1,6-diol, 2-ethylhexane-1,3-diol 2-butyl-2-ethylpropanediol are used.

The quantitative ratios of the components used are preferably chosen in step (ii) such that a hard segment content in the range from 10% to 40% is obtained.

According to the invention, it is possible that the reactions in step (i) and step (ii) are conducted in two separate steps. According to the invention, it is alternatively possible that the process is conducted in one stage. According to the invention, the process can be run in a multistage or else continuous operation, for example in a reaction extruder in which the prepolymer is produced continuously in the first zones. It is likewise possible, for example, first to continuously produce a prepolymer as per step (i) in a tubular reactor or tank and then to run step (ii), for example in the form of a reaction in a belt extruder or reaction extruder process.

Especially in the case of use of isocyanate compositions comprising NDI and TODI, it has been found to be advantageous to run the process in a two-stage operation. It is advantageous here in accordance with the invention first to react the polyol component, the isocyanate component and optionally auxiliaries or additives and optionally catalysts in a first reaction, and then to react the resultant prepolymer with the chain extender, and optionally auxiliaries or additives, cell nucleators and catalysts. According to the invention, the NCO/OH ratio is preferably between 0.85 and 1.30.

A one-stage process regime has been found to be advantageous, for example, in the case of use of MDI.

In a further aspect, the present invention also relates to a thermoplastic polyurethane obtainable or obtained by a process at least comprising steps (i) and (ii):

(i) converting at least one isocyanate composition (ZI) comprising an isocyanate (I1) selected from the group consisting of naphthylene 1,5-diisocyanate (NDI), diphenylmethane 4,4'-diisocyanate (MDI), p-phenyl diisocyanate (PPDI) and o-tolidine diisocyanate (TODI), ethylene diphenyl diisocyanate (EDI) or mixtures thereof and a polyol composition (ZP) comprising a polytetrahydrofuran or a derivative thereof to obtain a prepolymer having isocyanate groups, (ii) reacting the prepolymer obtained in step (i) with at least one chain extender (KV).

With regard to preferred embodiments, reference is made to the above remarks relating to preferred starting materials and reaction conditions.

It has been found that, surprisingly, the thermoplastic polyurethanes of the invention are especially suitable for production of a foamed pellet material. The resultant foamed pellets have good mechanical properties and especially very good resilience.

The present invention accordingly further relates, in a further aspect, also to a foamed pellet material comprising a thermoplastic polyurethane obtainable or obtained by a process of the invention or a thermoplastic polyurethane of the invention.

The foamed pellet materials of the invention have good processibility to molded articles. More particularly, it has been found that the foamed pellet materials have good weldability. In a further aspect, the present invention also relates to a molded article made from a foamed pellet material as described above.

The present invention further relates to the use of a thermoplastic polyurethane obtainable or obtained by a process of the invention or a thermoplastic polyurethane of the invention for production of a molded article or a foamed pellet material.

As well as the properties of the thermoplastic polyurethane, the process for producing a foamed pellet material also often has a crucial influence on the profile of properties of the resulting beads.

In a further aspect, the present invention also relates to a process for producing a foamed pellet material. In this case, the present invention relates to a process for producing a foamed pellet material, comprising the steps of (i) providing a composition (Z1) comprising a thermoplastic polyurethane, where the thermoplastic polyurethane is obtainable or obtained by a process at least comprising steps (a) and (b):

(a) converting at least one isocyanate composition (ZI) comprising an isocyanate (I1) selected from the group consisting of naphthylene 1,5-diisocyanate (NDI), diphenylmethane 4,4'-diisocyanate (MDI), p-phenyl diisocyanate (PPDI) and o-tolidine diisocyanate (TODI), ethylene diphenyl diisocyanate (EDI) or mixtures thereof and a polyol composition (ZP) comprising a polytetrahydrofuran or a derivative thereof to obtain a prepolymer having isocyanate groups, (b) reacting the prepolymer obtained in step (a) with at least one chain extender (KV);

(ii) impregnating the composition (Z1) with a blowing agent under pressure;

(iii) expanding the composition (Z1) by means of a pressure drop.

Within the context of the present invention, the composition (Z1) can be used here in the form of a melt or in the form of a pellet material.

As regards preferred embodiments of the process, suitable starting materials or mixing ratios, reference is made to the statements above which apply correspondingly.

The process of the invention may comprise further steps, for example temperature adjustments.

The unexpanded polymer mixture of the composition (Z1) required for the production of the foamed pellet material is produced in a known manner from the individual components and also optionally further components such as, by way of example, processing aids, stabilizers, compatibilizers or pigments. Examples of suitable processes are conventional mixing processes with the aid of a kneader, in continuous or batchwise mode, or with the aid of an extruder, for example a co-rotating twin-screw extruder.

In the case of compatibilizers or auxiliaries, such as for example stabilizers, these may also already be incorporated into the components during the production of the latter. The individual components are usually combined before the mixing process, or metered into the apparatus that performs the mixing. In the case of an extruder, the components are all metered into the intake and conveyed together into the extruder, or individual components are added in via a side feed.

The processing takes place at a temperature at which the components are present in a plastified state. The temperature depends on the softening or melting ranges of the components, but must be below the decomposition temperature of each component. Additives such as pigments or fillers or others of the abovementioned customary auxiliaries, for example flame retardants or antistatic auxiliaries, are not also melted, but rather incorporated in the solid state.

Further embodiments using well-established methods are possible here, it being possible to integrate the processes used in the production of the starting materials directly into the production. By way of example, it would be possible in the case of the belt process, in which the material is fed into an extruder in order to obtain lenticular pellets, to introduce the polymer, the impact modifier, and also fillers or dyes, directly at the end of the belt.

Some of the abovementioned customary auxiliaries may be added to the mixture in this step.

The foamed pellet materials of the invention generally have a bulk density of 50 g/l to 200 g/l, preferably 60 g/l to 180 g/l, more preferably 80 g/l to 150 g/l.

As stated above, the diameter of the individual beads of the foamed pellets is from 0.5 to 30 mm, preferably 1 to 15 mm and especially from 3 to 12 mm. In the case of nonspherical, for example elongate or cylindrical, foamed pellets, diameter means the longest dimension.

The foamed pellet materials can be produced by the well-established methods known in the prior art by means of (i) providing a composition (Z1) of the invention;

(ii) impregnating the composition with a blowing agent under pressure;

(iii) expanding the composition by means of a pressure drop.

The amount of blowing agent is preferably 0.1 to 50 parts by weight, especially 0.5 to 35 parts by weight and more preferably 1 to 30 parts by weight, based on 100 parts by weight of the amount used of composition (Z1).

One embodiment of the abovementioned process comprises (i) providing a composition (Z1) of the invention in the form of a pellet material;

(ii) impregnating the pellet material with a blowing agent under pressure;

(iii) expanding the pellet material by means of a pressure drop.

A further embodiment of the abovementioned process comprises a further step:

(i) providing a composition (Z1) of the invention in the form of a pellet material;

(ii) impregnating the pellet material with a blowing agent under pressure;

(iii-a) reducing the pressure to standard pressure without foaming the pellet material, optionally by prior reduction of the temperature, (iii-b) foaming the pellet material by means of an increase in temperature.

The unexpanded pellet material here preferably has an average minimum diameter of 0.2-10 mm (determined via 3D evaluation of the pellet material, for example via dynamic image analysis with the use of a PartAn 3D optical measuring apparatus from Microtrac).

In a further embodiment, the present invention also relates to a process for producing a foamed pellet material as described above, wherein the polyurethane is impregnated with the blowing agent in an extruder, the impregnated polyurethane is cut into a pellet material, and the pellet material, immediately after the cutting, is expanded to give expanded thermoplastic polyurethane beads.

The individual pellets generally have an average mass in the range from 0.1 to 100 mg, for example in the range from 1 to 50 mg, preferably in the range from 4 to 40 mg and more preferably in the range from 7 to 32 mg. This average mass of the pellets (bead weight) is determined as the arithmetic average by weighing three batches each of 10 pellet particles.

One embodiment of the abovementioned process comprises impregnating the pellet material with a blowing agent under pressure and subsequently expanding the pellet material in steps (I) and (II):

(I) impregnating the pellet material in the presence of a blowing agent under pressure at elevated temperatures in a suitable, closed reaction vessel (e.g. autoclave)

(II) abrupt expansion without cooling.

The impregnation in step (I) can be effected here in the presence of water and optionally suspension agents or suspension auxiliaries, or solely in the presence of the blowing agent and in the absence of water.

Suitable suspension auxiliaries are, for example, water-insoluble inorganic solids, such as tricalcium phosphate, magnesium pyrophosphate, metal carbonates; and also poly-vinyl alcohol and ionic surfactants, for example sodium dodecylarylsulfonate, or nonionic surfactants. They are typically used individually or in combination, in amounts of 0.05% to 10% by weight, based on the composition of the invention.

Depending on the chosen pressure, the impregnation temperatures are in the range from 90° C. to 200° C., preferably 100° C.-200° C., further preferably 100° C. to 180° C., where the pressure in the reaction vessel is between 2-250 bar, preferably between 5 and 100 bar, more preferably between 20 and 60 bar, the impregnation time generally being 0.5 to 10 hours.

In a further embodiment, the present invention also relates to a process for producing a foamed pellet material as described above, wherein the pellet material is impregnated in step (i) with 0.1% to 50% by weight of a blowing agent at a temperature in the range from 90 to 180° C. and a pressure in the range from 0.5 to 10 MPa.

The performance of the process in suspension is known to those skilled in the art and has been described extensively in WO2007/082838, for example.

In the case of performance of the process in the absence of the blowing agent, care must be taken to avoid aggregation of the polymer pellet material.

Suitable blowing agents for performing the process in a suitable closed reaction vessel are by way of example organic liquids and gases which are in a gaseous state under the processing conditions, such as hydrocarbons or inorganic gases or mixtures of organic liquids or gases with inorganic gases, where these may also be combined.

Examples of suitable hydrocarbons are halogenated or non-halogenated, saturated or unsaturated aliphatic hydrocarbons, preferably non-halogenated, saturated or unsaturated aliphatic hydrocarbons.

Preferred organic blowing agents are saturated, aliphatic hydrocarbons, in particular those having 3 to 8 carbon atoms, for example butane or pentane.

Suitable inorganic gases are nitrogen, air, ammonia or carbon dioxide, preferably nitrogen or carbon dioxide, or mixtures of the abovementioned gases.

In a further embodiment, the impregnation of the pellet material with a blowing agent under pressure comprises processes and subsequent expansion of the pellet material in steps ($\alpha$) and ($\beta$):

($\alpha$) impregnating the pellet material in the presence of a blowing agent under pressure at elevated temperatures in an extruder ($\beta$) pelletizing the composition emerging from the extruder under conditions that assure controlled foaming.

Suitable blowing agents in this process variant are volatile organic compounds having a boiling point at standard pressure, 1013 mbar, of −25° C. to 150° C., especially −10° C. to 125° C. Of good suitability are hydrocarbons (preferably halogen-free), especially C4-10-alkanes, for example the isomers of butane, of pentane, of hexane, of heptane and of octane, more preferably isobutane. Further possible blowing agents are also more sterically demanding compounds such as alcohols, ketones, esters, ethers and organic carbonates.

The composition is mixed here under pressure in step ($\alpha$) in an extruder, under melting, with the blowing agent which is supplied to the extruder. The blowing agent-containing mixture is extruded and pelletized under pressure, preferably with backpressure controlled to a moderate level (e.g. underwater pelletization). The melt strand foams in the process, and pelletization gives the foamed pellets.

Performance of the process via extrusion is known to those skilled in the art and has been described, by way of example, extensively in WO2007/082838, and also in WO 2013/153190 A1.

In one embodiment, it is possible here, for example, that the polyurethane is impregnated with the blowing agent in an extruder, the impregnated polyurethane is cut to a pellet material, and the pellet material, after cutting, is expanded to give the expanded thermoplastic polyurethane beads. In order to impregnate the polyurethane with the blowing agent, the thermoplastic polyurethane is mixed in the extruder, under melting, with a blowing agent which is supplied to the extruder. The blowing agent-containing mixture is then expressed and pelletized under such pressure and temperature conditions that expanded foam beads are obtained. The pressure and temperature here are dependent on the polyurethane used and the amount of blowing agent. The pressure is typically in the range from 1 to 20 bar, preferably in the range from 2 to 15 bar, and the temperature between 20° C. and 60° C., preferably between 20° C. and 40° C.

The production of the thermoplastic polyurethane and the addition of the blowing agent for production of the expanded thermoplastic polyurethane can be effected in two different extruders. Alternatively, however, it is also possible to use just one extruder. In this case, the front part of the extruder to which the isocyanate, the isocyanate-reactive compound, the chain extender and any further additives are added serves as reactive extruder, and the blowing agent is added at a downstream point in the extruder where the conversion to the polyurethane is complete.

In an alternative embodiment, the production of a foamed pellet material from a thermoplastic polyurethane of the invention comprises steps (a) to (c):

(a) providing the thermoplastic polyurethane in the form of beads in a suitable geometric pellet form, (b) impregnating the pellet material with a blowing agent under pressure and temperature in a tank or an autoclave.

(c) spontaneously decompressing the tank, with the pressure drop and the expansion of the blowing agent dissolved in the pellet material giving rise to foam beads.

In general, the thermoplastic PUs are converted to the desired shape of pellets either directly in the course of production thereof or in a separate step (a). Preference is given to using cylindrical, ellipsoidal or spherical pellets having an average diameter of 0.2 to 10 mm, especially 0.5 to 5 mm. In the case of cylindrical or ellipsoidal pellet material, diameter means the longest dimension.

The individual pellets generally have an average mass in the range from 1 to 100 mg, preferably in the range from 2 to 60 mg, further preferably in the range from 3 to 50 mg and more preferably in the range of 4-35 mg. This average mass of the pellets (bead weight) is determined as the arithmetic average by weighing three batches each of 10 pellet particles. This preferably cylindrical or round pellet material can be produced by any compounding methods known to the person skilled in the art, with subsequent pelletization in the form of cold or hot chopping.

This pellet material is typically impregnated in step (b) in aqueous suspension with 0.1% to 50% by weight of a blowing agent at a temperature in the range from 90 to 180° C. and a pressure in the range from 0.5 to 10 MPa. Subsequently, the hot aqueous suspension comprising the pellet material, without cooling down, is expanded abruptly (explosive expansion method), with direct foaming of the softened, blowing, agent-containing beads to give the expanded beads. The expanded thermoplastic polyurethane can in principle be produced as described in WO-A 2007/082838.

The blowing agent used for production of the expanded thermoplastic polyurethane beads may vary depending on the production process.

In the case of addition of the blowing agent to the extruder or an impregnation tank, the blowing agents used are preferably volatile organic compounds having a boiling point at standard pressure of 1013 mbar in the range from −2.5 to 160° C. especially −10 to 125° C. Of good suitability are optionally halogen-substituted hydrocarbons, preference being given to halogen-free hydrocarbons. Particular preference is given to $C_4$-$C_{10}$-alkanes, for example the isomers of butane, pentane, cyclopentane, hexane, heptane, and octane, more preferably s-pentane. Suitable blowing agents are also more sterically demanding compounds such as alcohols, ketones, esters, ethers and organic carbonates. According to the invention, it is also possible to use mixtures of the blowing agents mentioned. Suitable inorganic gases are, for example, nitrogen, air, ammonia or carbon dioxide, or combinations of these or combinations with the above-mentioned further blowing agents.

These inorganic gases mentioned may likewise be used in the case of impregnation in an autoclave. It is also possible to use halohydrocarbons, but the blowing agent is preferably halogen-free. However, small proportions of halogenated blowing agents in the blowing agent mixture are not to be ruled out. The blowing agents may be used either as a pure substance or in any mixture.

As well as the blowing agents mentioned, in the case of production of the expanded thermoplastic pellet material both by extrusion and in aqueous suspension, it is possible to use nitrogen and/or carbon dioxide, especially supercritical carbon dioxide.

The amount of blowing agent is preferably in the range from 0.1 to 50 parts by weight, especially 0.5 to 40 and more preferably 1 to 30 parts by weight, based on 100 parts by weight of thermoplastic polyurethane used.

Nitrogen may also be supplied as co-blowing agent at an onset temperature below the first melt peak in the DSC of the thermoplastic elastomer, for example in the range from 30 to 75° C., by injection and elevation of the internal pressure in the impregnation reactor by 200 to 3000 kPa.

The impregnation in step (b) is preferably effected at an impregnation temperature IMT in the range from 90 to 190° C. For this purpose, the suspension is generally heated up to the impregnation temperature (IMT) at a heating rate of preferably 2° C./min or higher and optionally kept at this temperature or within a range from 2° C. above the IMT down to 5° C. below the IMT for a period of 2 to 100 minutes (hold time HZ).

The blowing agent-containing pellets obtained in step (b) are foamed in a subsequent step (c) by expanding to foam beads. The suspension is generally expanded in step (c) by emptying the pressure vessel via an open shutoff valve into an expansion vessel.

The foamed pellets composed of a thermoplastic polyurethane of the invention that are obtainable by the processes of the invention preferably have a bulk density in the range from 20 to 250 kg/m³, more preferably in the range from 35 to 150 kg/m³.

The foamed pellets are generally at least approximately spherical. The exact geometric shape or diameter is dependent on the chosen geometry and particle weight of the original pelletized material and on the bulk density produced.

The present invention accordingly also relates to a foamed pellet material obtained by a process as described above, wherein the average diameter of the particles is preferably in the range from 0.5 to 20 mm.

The particles typically have a maximum linear expansion in the range from 1 to 25 mm, preferably from 2 to 15 mm and more preferably a maximum linear expansion of 3-10 mm.

The expanded foam beads produced in accordance with the invention typically have predominantly closed cells, determining the proportion by volume of closed cells in accordance with DIN EN ISO 4590 of Aug. 1, 2003, and generally have a cell density (number of cells/area) of 1 to 750 cells/mm², preferably 2 to 500 cells/mm², especially 5 to 200 cells/mm² and more preferably 10 to 100 cells/mm².

Suitable apparatuses for performing the process of the invention for producing foamed beads are known per se to the person skilled in the art.

Extruders that can be used are any of the conventional screw-based machines, in particular single-screw and twin-screw extruders (e.g. ZSK type from Werner & Pfleiderer), co-kneader's, Kombiplast machines, MPC kneading mixers, FCM mixers, KEX kneading screw extruders and shear-roll extruders, as described by way of example in Saechtling (ed.), Kunststoff-Taschenbuch, 27th edition, Hanser-Verlag, Munich 1998, chapters 3.2.1 and 3.2.4. The extruder is usually operated at a temperature at which the composition (Z1) is present as a melt, for example at 120° C. to 250° C., in particular 150 to 210° C., and at a pressure, after addition of the blowing agent, of 40 to 200 bar, preferably 60 to 150 bar, more preferably 80 to 120 bar, in order to ensure homogenization of the blowing agent with the melt.

The process here can be conducted in an extruder or in an arrangement composed of one or more extruders. Thus, by way of example, the components can be melted and blended, and a blowing agent injected, in a first extruder. In the second extruder, the impregnated melt is homogenized and the temperature and/or the pressure is adjusted. If, by way of example, three extruders are combined with one another, the mixing of the components and the injection of the blowing agent can also be split between two different process sections. If, as is preferred, only one extruder is used, all of the process steps—melting, mixing, injection of the blowing agent, homogenization and adjustment of the temperature and/or of the pressure—are carried out in a single extruder.

As an alternative and in accordance with the methods described in WO 2014/150122 or WO 2014/150124 A1, the corresponding foamed pellets, which may even already have been colored, can be produced directly from the pellets in that the corresponding pellets are saturated with a supercritical liquid and removed from the supercritical liquid, followed by (i') immersing the article in a heated fluid or (ii') irradiating the article with high-energy radiation (e.g. infrared or microwave irradiation).

Examples of suitable supercritical liquids are those described in WO2014150122 or, e.g. carbon dioxide, nitrogen dioxide, ethane, ethylene, oxygen or nitrogen, preferably carbon dioxide or nitrogen.

The supercritical liquid here can also comprise a polar liquid with a Hildebrand solubility parameter equal to or greater than 9 $MPa^{-1/2}$.

The supercritical fluid or the heated fluid here may also comprise a dye, as a result of which a colored, foamed article is obtained.

The expanded thermoplastic polyurethane beads, i.e. the foamed pellet materials, are especially utilized for production of molded articles from bead foams. In a further aspect, the present invention also relates to a molded article made from a foamed pellet material as described above. Processes for producing such molded articles are known per se.

In a further aspect, the present invention also relates to the use of a foamed pellet material of the invention or of a foamed pellet material obtained or obtainable by a process of the invention for production of molded articles. In a further embodiment, the present invention accordingly also relates to the use of a foamed pellet material of the invention, or of a foamed pellet material obtained or obtainable by a process of the invention, for production of molded articles, wherein the molded article is produced by means of fusion or bonding of the beads to one another.

In a further aspect, the present invention also relates to the use of a foamed pellet material of the invention for production of a molded article. The present invention further provides a molded article produced from the foamed pellets of the invention.

A process suitable in accordance with the invention for production of a molded article from a foamed pellet material comprises, for example, the following steps:

(A) introducing the foamed pellets of the invention into an appropriate mold, (B) fusing the foamed pellets of the invention from step (i).

The fusing in step (B) is preferably effected in a closed mold, wherein the fusing can be effected by means of steam, hot air (as described for example in EP1979401B1) or high-energy radiation (microwaves or radio waves).

The temperature in the fusing of the foamed pellet material is preferably below or close to the melting temperature of the polymer from which the bead foam was produced. For the standard polymers, the temperature for the fusing of the foamed pellet material is accordingly between 100° C. and 180° C., preferably between 120 and 150° C.

Temperature profiles/residence times can be ascertained individually here, for example in analogy to the processes described in US20150337102 or EP2872309B1.

Fusion by way of high-energy radiation is generally effected in the frequency range of microwaves or radio waves, optionally in the presence of water or of other polar liquids, for example microwave-absorbing hydrocarbons having polar groups (for example esters of carboxylic acids and of diols or of triols, or glycols and liquid polyethylene glycols), and can be effected in analogy to the processes described in EP3053732A, or WO16146537.

A preferred process for production of individual molded articles from such foam beads comprises the following steps:

(a) introducing the expanded thermoplastic polyurethane beads into a mold;

(b) contacting the expanded thermoplastic polyurethane beads introduced into the mold with steam, hot air or high-energy radiation, such that the expanded thermoplastic polyurethane beads melt at the surface and are welded to form the molding.

The heating of the surface of the beads of the foamed pellet material which is required for welding, such that they melt at the surface, is achieved by contacting with steam, hot air or high-energy radiation, each individually or in any combinations. Suitable high-energy radiation is, for example, microwave radiation, radiofrequency radiation or infrared radiation. However, preference is given to the use of steam or hot air, especially of steam.

In a further embodiment, the present invention accordingly also relates to the use as described above, wherein the molded article is produced by means of welding or bonding of the beads to one another.

When the polyurethane beads are welded using steam, the temperature of the steam that is introduced into the mold can be adjusted via the pressure. According to the invention, as well as saturated steam, it is also possible to use superheated steam or unsaturated steam. Suitable pressures with which the steam is introduced into the mold are, for example, 0.1 bar to 6 bar, preferably 0.3 to 3 bar.

As stated above, the foamed pellet material may also comprise dyes. Dyes can be added here in various ways.

In one embodiment, the foamed pellets produced can be colored after production. In this case, the corresponding foamed pellets are contacted with a carrier liquid comprising a dye, the carrier liquid (CL) having a polarity suitable for sorption of the carrier liquid into the foamed pellet material. This can be carried out in analogy to the methods described in the EP application having application number 17198591.4.

Examples of suitable colorants are inorganic or organic pigments. Examples of suitable natural or synthetic inorganic pigments are carbon black, graphite, titanium oxides, iron oxides, zirconium oxides, cobalt oxide compounds, chromium oxide compounds, copper oxide compounds. Examples of suitable organic pigments are azo pigments and polycyclic pigments.

In a further embodiment, the color can be added in the production of the foamed pellet material. By way of example, the colorant can be added into the extruder in the production of the foamed pellet material via extrusion.

As an alternative, material that has already been colored can be used as starting material for the production of the foamed pellet material, this being extruded or expanded in the closed vessel by the processes mentioned above.

In addition, in the process described in WO2014150122, the supercritical liquid or the heated liquid may comprise a dye.

As stated above, the molded articles of the invention have advantageous properties for the abovementioned applications in the footwear and sports shoe sector requirement.

Characteristic features of the tensile properties and compression properties of the molded articles produced from the foamed pellets are that tensile strength is above 600 kPa (ASTM D 5035), elongation at break is above 100% (ASTM D 503), and compressive stress at 10% compression is above 15 kPa (analogously to DIN EN ISO 844, November 2014; the departure from the standard lies in the height of the sample, 20 mm instead of 50 mm, and thus the adjustment of the testing speed to 2 mm/min).

The resilience of the molded articles produced from the foamed pellets is preferably above 55% (analogously to DIN 53512, April 2000; the departure from the standard is the test specimen height, which should be 12 mm, but this test is conducted with 20 mm in order to avoid "penetration" of the sample and measurement of the substrate).

As stated above, there is a relationship between the density and compression properties of the molded articles produced. The density of the moldings produced is advantageously from 75 to 375 kg/m$^3$, preferably from 100 to 300 kg/m$^3$, more preferably from 150 to 200 kg/m$^3$ (DIN EN ISO 845, October 2009).

The ratio of the density of the molding to the bulk density of the foamed pellets of the invention (densification level VG) is generally between 1.5 and 3.5, preferably 1.8 to 2.5.

The foamed pellets of the invention can be processed with particular efficiency to give footwear soles, part of a footwear sole, mattresses, underlays, grips, protective films, components in automobile interiors and exteriors, gymnastics mats, body protectors, trim elements in automobile construction, sound insulators, vibration dampers, cushions, bicycle saddles, in toys, tires or tire parts, or as covering for a track and field surface, a sports hall or a pathway, a damping layer or a damping core in a sandwich element, or a packaging.

In a further embodiment, the present invention accordingly also relates to the use as described above, wherein the molded article is a footwear sole, part of a footwear sole, a mattress, underlay, grip, protective film, a component in automobile interiors and exteriors, a gymnastics mat, a body protector, a trim element in automobile construction, a sound insulator, a vibration damper, a cushion, a bicycle seat, a toy, a tire or part of a tire, or a covering for a track and field surface, a sports hall or a pathway, a damping layer or a damping core in a sandwich element, or a packaging.

In a further aspect, the present invention also relates to the use of a foamed pellet material as described above in balls and sports equipment or as floor covering and wall paneling, especially for sports surfaces, track and field surfaces, sports halls, children's playgrounds and pathways.

The molded articles obtained in accordance with the invention are suitable, for example, for the production of footwear soles, parts of a footwear sole, bicycle saddles, cushioning, mattresses, underlays, grips, protective films, components in automobile interiors and exteriors, in balls and sports equipment or as floor covering and wall paneling, especially for sports surfaces, track and field surfaces, sports halls, children's playgrounds and pathways.

In a further embodiment, the present invention accordingly also relates to the use of a foamed pellet material of the invention or of a foamed pellet material obtained or obtainable by a process of the invention for production of molded articles, wherein the molded article is a shoe sole, part of a shoe sole, a bicycle saddle, cushioning, a mattress, underlay, grip, protective film, a component in automobile interiors and exteriors.

In a further aspect, the present invention also relates to the use of the foamed pellets or foamed beads of the invention in balls and sports equipment or as floor covering and wall paneling, especially for sports surfaces, track and field surfaces, sports halls, children's playgrounds and pathways.

In a further aspect, the present invention also relates to a hybrid material comprising a matrix composed of a polymer (PM) and a foamed pellet material according to the present invention. Materials comprising a foamed pellet material and a matrix material are referred to as hybrid materials in the context of this invention. The matrix material here may be composed of a compact material or likewise of a foam.

Polymers (PM) suitable as matrix material are known per se to those skilled in the art. By way of example, ethylene-vinyl acetate copolymers, epoxy-based binders or else polyurethanes are suitable in the context of the present invention. Polyurethane foams or else compact polyurethanes, for example thermoplastic polyurethanes, are suitable here in accordance with the invention.

According to the invention, the polymer (PM) is chosen here such that there is sufficient adhesion between the foamed pellet material and the matrix to obtain a mechanically stable hybrid material.

The matrix here may completely or partly surround the foamed pellet material. According to the invention, the hybrid material may comprise further components, by way of example further fillers or else pellets. According to the invention, the hybrid material can also comprise mixtures of different polymers (PM). The hybrid material may also comprise mixtures of foamed pellets.

Foamed pellets that can be used in addition to the foamed pellet material according to the present invention are known per se to those skilled in the art. Foamed pellets composed of thermoplastic polyurethanes are particularly suitable in the context of the present invention.

In one embodiment, the present invention accordingly also relates to a hybrid material comprising a matrix composed of a polymer (PM), a foamed pellet material according to the present invention and a further foamed pellet material composed of a thermoplastic polyurethane.

In the context of the present invention, the matrix consists of a polymer (PM). Examples of suitable matrix materials in the context of the present invention are elastomers or foams, especially foams based on polyurethanes, for example elastomers such as ethylene-vinyl acetate copolymers or else thermoplastic polyurethanes.

The present invention accordingly also relates to a hybrid material as described above, wherein the polymer (PM) is an elastomers The present invention further relates to a hybrid material as described above, wherein the polymer (PM) is selected from the group consisting of ethylene-vinyl acetate copolymers and thermoplastic polyurethanes.

In one embodiment, the present invention also relates to a hybrid material comprising a matrix composed of an ethylene-vinyl acetate copolymer and a foamed pellet material according to the present invention.

In a further embodiment, the present invention relates to a hybrid material comprising a matrix composed of an ethylene-vinyl acetate copolymer, a foamed pellet material according to the present invention and a further foamed pellet material composed for example of a thermoplastic polyurethane.

In one embodiment, the present invention relates to a hybrid material comprising a matrix composed of a thermoplastic polyurethane and a foamed pellet material according to the present invention.

In a further embodiment, the present invention relates to a hybrid material comprising a matrix composed of a thermoplastic polyurethane, a foamed pellet material according to the present invention and a further foamed pellet material composed for example of a thermoplastic polyurethane.

Suitable thermoplastic polyurethanes are known per se to those skilled in the art. Suitable thermoplastic polyurethanes are described, for example, in "Kunststoffhandbuch, volume 7, Polyurethane", Carl Hanser Verlag, 3rd edition 1993, chapter 3.

Within the context of the present invention, the polymer (PM) is preferably a polyurethane. "Polyurethane" within the meaning of the invention encompasses all known resilient polyisocyanate polyaddition products. These include, in particular, compact polyisocyanate polyaddition products, such as viscoelastic gels or thermoplastic polyurethanes, and resilient foams based on polyisocyanate polyaddition products, such as flexible foams, semirigid foams or integral foams. Within the meaning of the invention, "polyurethanes" are also understood to mean resilient polymer blends comprising polyurethanes and further polymers, and also foams of these polymer blends. The matrix is preferably a cured, compact polyurethane binder, a resilient polyurethane foam or a viscoelastic gel.

Within the context of the present invention, a "polyurethane binder" is understood here to mean a mixture which consists to an extent of at least 50% by weight, preferably to an extent of at least 80% by weight and especially to an extent of at least 95% by weight, of a prepolymer having isocyanate groups, referred to hereinafter as isocyanate prepolymer. The viscosity of the polyurethane binder of the invention is preferably within a range from 500 to 4000 mPa·s, more preferably from 1000 to 3000 mPa·s, measured at 25° C. to DIN 53 018.

In the context of the invention "polyurethane foams" are to be understood to mean foams according to DIN 7726.

The density of the matrix material is preferably in the range from 1.2 to 0.01 g/cm³. The matrix material is more preferably a resilient foam or an integral foam having a density in the range from 0.8 to 0.1 g/cm³, especially from 0.6 to 0.3 g/cm³, or a compact material, for example a cured polyurethane binder.

Foams are particularly suitable matrix materials. Hybrid materials comprising a matrix material composed of a polyurethane foam preferably have good adhesion between the matrix material and foamed pellet material.

In one embodiment, the present invention also relates to a hybrid material comprising a matrix composed of a polyurethane foam and a foamed pellet material according to the present invention.

In a further embodiment, the present invention relates to a hybrid material comprising a matrix composed of a polyurethane integral foam, a foamed pellet material according to the present invention and a further foamed pellet material composed for example of a thermoplastic polyurethane.

In one embodiment, the present invention relates to a hybrid material comprising a matrix composed of a polyurethane integral foam and a foamed pellet material according to the present invention.

In a further embodiment, the present invention relates to a hybrid material comprising a matrix composed of a polyurethane integral foam, a foamed pellet material according to the present invention and a further foamed pellet material composed for example of a thermoplastic polyurethane.

A hybrid material of the invention, comprising a polymer (PM) as matrix and a foamed pellet material of the invention, can by way of example be produced by mixing the components used to produce the polymer (PM) and the foamed pellet material optionally with further components, and reacting them to give the hybrid material, the reaction preferably being effected under conditions under which the foamed pellet material is essentially stable.

Suitable processes and reaction conditions for producing the polymer (PM), especially an ethylene-vinyl acetate copolymer or a polyurethane, are known per se to those skilled in the art.

In a preferred embodiment, the hybrid materials of the invention are integral foams, especially integral foams based on polyurethanes. Suitable processes for producing integral foams are known per se to those skilled in the art. The integral foams are preferably produced by the one-shot process using the low-pressure or high-pressure technique in closed, advantageously temperature-controlled molds. The molds are usually made of metal, for example aluminum or steel. These procedures are described for example by Piechota and Röhr in "Integralschaumstoff" [integral Foam], Carl-Hanser-Verlag, Munich, Vienna, 1975, or in "Kunststoff-Handbuch", volume 7, "Polyurethane", 3rd edition, 1993, chapter 7.

If the hybrid material of the invention comprises an integral foam, the amount of the reaction mixture introduced into the mold is such that the molded articles composed of integral foams that are obtained have a density of 0.08 to 0.70 g/cm³, especially of 0.12 to 0.60 g/cm³. The densification levels for production of the molded articles having a compacted edge zone and cellular core are in the range from 1.1 to 8.5, preferably from 2.1 to 7.0.

It is thus possible to produce hybrid materials having a matrix composed of a polymer (PM) and incorporating the foamed pellet material of the invention, in which there is a homogeneous distribution of the foamed beads. The foamed pellet material of the invention can readily be used in a process for producing a hybrid material since the individual beads are free-flowing on account of their small size and do not place any specific demands on processing. It is possible here to use techniques for homogeneously distributing the foamed pellet material, such as slow rotation of the mold.

Further auxiliaries and/or additives may optionally also be added to the reaction mixture for producing the hybrid materials of the invention. Mention may be made by way of example of surface-active substances, foam stabilizers, cell regulators, release agents, fillers, dyes, pigments, hydrolysis stabilizers, odor-absorbing substances and fungistatic and bacteriostatic substances.

Examples of surface-active substances that can be used are compounds which serve to support homogenization of the starting materials and which optionally are also suitable for regulating the cell structure. Mention may be made by way of example of emulsifiers, for example the sodium salts of castor oil sulfates or of fatty acids and also salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers, such as siloxane-oxyalkylene copolymers and other organopolysiloxanes, ethoxylated alkylphenols, ethoxylated fatty alcohols, paraffin oils, castor oil esters or ricinoleic esters, turkey red oil and peanut oil, and cell regulators, for example paraffins, fatty alcohols and dimethylpolysiloxanes. Oligomeric acrylates having polyoxyalkylene and fluoroalkane radicals as pendant groups are also suitable for improving the emulsifying action, cell structure and/or stabilization of the foam.

Suitable release agents for example include: reaction products of fatty acid esters with polyisocyanates, salts of amino group-comprising polysiloxanes and fatty acids, salts of saturated or unsaturated (cyclo)aliphatic carboxylic acids having at least 8 carbon atoms and tertiary amines, and also in particular internal release agents, such as carboxylic esters and/or carboxylic amides, produced by esterification or amidation of a mixture of montanic acid and at least one aliphatic carboxylic acid having at least 10 carbon atoms with at least difunctional alkanolamines, polyols and/or polyamines having molecular weights of 60 to 400, mixtures of organic amines, metal salts of stearic acid and organic mono- and/or dicarboxylic acids or anhydrides thereof or mixtures of an imino compound, the metal salt of a carboxylic acid and optionally a carboxylic acid.

Fillers, in particular reinforcing fillers, are understood to mean the customary organic and inorganic fillers, reinforcers, weighting agents, agents for improving abrasion behavior in paints, coating compositions etc., these being known per se. Specific examples which may be mentioned are: inorganic fillers such as siliceous minerals, for example sheet silicates such as antigorite, bentonite, serpentine, hornblendes, amphiboles, chrysotile, talc; metal oxides such as kaolin, aluminum oxides, titanium oxides, zinc oxide and iron oxides, metal salts such as chalk, barite and inorganic pigments such as cadmium sulfide, zinc sulfide and also glass and the like. Preference is given to using kaolin (china clay), aluminum silicate and coprecipitates of barium sulfate and aluminum silicate and also natural and synthetic fibrous minerals such as wollastonite, metal fibers and in particular glass fibers of various lengths, which may optionally have been sized. Examples of useful organic fillers include: carbon black, melamine, rosin, cyclopentadienyl resins and graft polymers, and also cellulose fibers, polyamide fibers, polyacrylonitrile fibers, polyurethane fibers, polyester fibers based on aromatic and/or aliphatic dicarboxylic esters, and in particular carbon fibers.

The inorganic and organic fillers can be used individually or as mixtures.

In a hybrid material of the invention, the proportion by volume of the foamed pellet material is preferably 20 percent by volume or more, more preferably 50 percent by volume and more preferably 80 percent by volume or more and especially 90 percent by volume or more, based in each case on the volume of the hybrid system of the invention.

The hybrid materials of the invention, especially hybrid materials having a matrix composed of cellular polyurethane, feature very good adhesion of the matrix material to the foamed pellet material of the invention. As a result, there is preferably no tearing of a hybrid material of the invention at the interface between matrix material and foamed pellet material. This makes it possible to produce hybrid materials having improved mechanical properties, such as tear propagation resistance and elasticity, compared to conventional polymer materials, especially conventional polyurethane materials, given the same density.

The elasticity of hybrid materials of the invention in the form of integral foams is preferably greater than 40% and more preferably greater than 50% according to DIN 53512.

Moreover, the hybrid materials of the invention, especially those based on integral foams, have high resiliences at low density. Integral foams based on hybrid materials of the invention are therefore outstandingly suitable in particular as materials for shoe soles. Light and comfortable soles with good durability properties are obtained as a result. Such materials are especially suitable as intermediate soles for sports shoes.

The hybrid materials of the invention having a cellular matrix are suitable, for example, for cushioning, for example of furniture, and mattresses.

Hybrid materials having a matrix composed of a viscoelastic gel especially feature increased viscoelasticity and improved resilient properties. These materials are thus likewise suitable as cushioning materials, by way of example for seats, especially saddles such as bicycle saddles or motorcycle saddles.

Hybrid materials having a compact matrix are by way of example suitable as floor coverings, especially as covering for playgrounds, track and field surfaces, sports fields and sports halls.

The properties of the hybrid materials of the invention may vary within wide ranges depending on the polymer (PM) used, and in particular can be varied within wide limits by variation of size, shape and nature of the expanded pellet material, or else by addition of further additives, for example also further non-foamed pellets such as plastics pellets, for example rubber pellets.

The hybrid materials of the invention have a high durability and toughness, which is made apparent in particular by a high tensile strength and elongation at break. In addition, hybrid materials of the invention have a low density.

Further embodiments of the present invention may be found in the description and the examples. It will be appreciated that the features of the subject matter/processes/uses according to the invention that are mentioned above and elucidated below are usable not only in the combination specified in each case but also in other combinations without departing from the scope of the invention. For example, the combination of a preferred feature with a particularly preferred feature or of a feature not characterized further with a particularly preferred feature etc. is thus also encompassed implicitly even if this combination is not mentioned explicitly.

Illustrative embodiments of the present invention are listed below, but these do not restrict the present invention. In particular, the present invention also encompasses those embodiments which result from the dependency references and hence combinations specified hereinafter.

1. A process for producing a thermoplastic polyurethane, at least comprising steps (i) and (ii):
   (i) converting at least one isocyanate composition (ZI) comprising an isocyanate (I1) selected from the group consisting of naphthylene 1,5-diisocyanate (NDI), diphenylmethane 4,4'-diisocyanate (MDI), p-phenyl diisocyanate (PPDI) and o-tolidine diisocyanate (TODI), ethylene diphenyl diisocyanate (EDI) or mixtures thereof and a polyol composition (ZP) comprising a polytetrahydrofuran or a derivative thereof to obtain a prepolymer having isocyanate groups,
   (ii) reacting the prepolymer obtained in step (i) with at least one chain extender (KV).

The process according to embodiment 1, wherein the derivative of polytetrahydrofuran is a poly-ε-caprolactone-polyol.

3. The process according to either of embodiments 1 and 2, wherein further components used in the reaction in step (ii) are selected from the group consisting of polyols, chain extenders, catalysts, cell nucleators, other auxiliaries and additives.

4. The process according to any of embodiments 1 to 3, wherein the poly-ε-caprolactonepolyol is obtainable or obtained by reaction of ε-caprolactone and a starter molecule selected from the group consisting of polytetrahydrofurans having a number-average molecular weight in the range from 500 to 2500 g/mol.

5. The process according to any of embodiments 1 to 4, wherein the poly-ε-caprolactonepolyol is obtainable or obtained by reaction of ε-caprolactone and a starter molecule selected from the group consisting of α-hydro-ω-hydroxypoly(oxytetramethylene)diols.

6. The process according to any of embodiments 1 to 5, wherein the polyol composition comprises the α-hydro-ω-hydroxypoly(oxytetramethylene)polyol in an amount in the range from 0.1% to 50% by weight, based on the polyol composition.

7. The process according to any of embodiments 1 to 6, wherein the polyisocyanate composition comprises naphthylene 1,5-diisocyanate (NDI) in an amount in the range from 90% to 100% by weight, based on the overall polyisocyanate composition.

8. The process according to any of embodiments 1 to 7, wherein the chain extender (KV) is selected from the group consisting of diols having a molecular weight in the range from 50 to 500 g/mol and diamines having a molecular weight in the range from 50 to 500 g/mol.

9. The process according to any of embodiments 1 to 8, wherein the chain extender (KV) is selected from the group consisting of MEG, butane-1,4-diol, propane-1, 3-diol, hexane-1,6-diol, 2-ethylhexane-1,3-diol or 2-butyl-2-ethylpropanediol.

10. A thermoplastic polyurethane obtainable or obtained by a process at least comprising steps (i) and (ii):
   (i) converting at least one isocyanate composition (ZI) comprising an isocyanate (I1) selected from the group consisting of naphthylene 1,5-diisocyanate (NDI), diphenylmethane 4,4'-diisocyanate (MDI), p-phenyl diisocyanate (PPDI) and o-tolidine diisocyanate (TODI), ethylene diphenyl diisocyanate (EDI) or mixtures thereof and a polyol composition (ZP) comprising a polytetrahydrofuran or a derivative thereof to obtain a prepolymer having isocyanate groups,
   (ii) reacting the prepolymer obtained in step (i) with at least one chain extender (KV).

11. The thermoplastic polyurethane according to embodiment 10, wherein the derivative of polytetrahydrofuran is a poly-ε-caprolactonepolyol.

12. The thermoplastic polyurethane according to either of embodiments 10 and 11, wherein further components used in the reaction in step (ii) are selected from the group consisting of polyols, chain extenders, catalyst, cell nucleators, other auxiliaries and additives.

13. The thermoplastic polyurethane according to any of embodiments 10 to 12, wherein the poly-ε-caprolactonepolyol is obtainable or obtained by reaction of ε-caprolactone and a starter molecule selected from the group consisting of porytetrahydrofurans having a number-average molecular weight in the range from 500 to 2500 g/mol.

14. The thermoplastic polyurethane according to any of embodiments 10 to 13, wherein the poly-ε-caprolactonepolyol is obtainable or obtained by reaction of ε-caprolactone and a starter molecule selected from the group consisting of α-hydro-ω-hydroxypoly(oxytetramethylene)diols.

15. The thermoplastic polyurethane according to any of embodiments 10 to 14, wherein the polyol composition comprises the α-hydro-ω-hydroxypoly(oxytetramethylene)polyol in an amount in the range from 0.1% to 50% by weight, based on the polyol composition.

16. The thermoplastic polyurethane according to any of embodiments 10 to 15, wherein the polyisocyanate composition comprises naphthylene 1,5-diisocyanate (NDI) in an amount in the range from 90% to 100% by weight, based on the overall polyisocyanate composition.

17. The thermoplastic polyurethane according to any of embodiments 10 to 16, wherein the chain extender (KV) is selected from the group consisting of diols having a molecular weight in the range from 50 to 500 g/mol and diamines having a molecular weight in the range from 50 to 500 g/mol.

18. The thermoplastic polyurethane according to any of embodiments 10 to 17, wherein the chain extender (KV) is selected from the group consisting of MEG, butane-1,4-diol, propane-1,3-diol, hexane-1,6-diol, 2-ethylhexane-1,3-diol or 2-butyl-2-ethylpropanediol.

19. A foamed pellet material comprising a thermoplastic polyurethane obtainable or obtained by a process according to any of embodiments 1 to 9 or a thermoplastic polyurethane according to any of embodiments 10 to 18.

20. The use of a thermoplastic polyurethane obtainable or obtained by a process according to any of embodiments 1 to 9 or a thermoplastic polyurethane according to any of embodiments 10 to 18 for production of a molded article or a bead foam.

21. A process for producing a foamed pellet material comprising a thermoplastic polyurethane according to embodiments 10 to 18, wherein the polyurethane is impregnated with the blowing agent in an extruder, the impregnated polyurethane is cut into a pellet material, and the pellet material, immediately after the cutting, is expanded to give expanded thermoplastic polyurethane beads.

22. A process for producing a foamed pellet material comprising a thermoplastic polyurethane according to any of embodiments 10 to 18, comprising steps (a) to (c):
   (a) providing the thermoplastic polyurethane in the form of beads in a suitable geometric pellet form,
   (b) impregnating the pellet material with a blowing agent under pressure and temperature in a tank or an autoclave,
   (c) spontaneously decompressing the tank, with the pressure drop and the expansion of the blowing agent dissolved in the pellet material giving rise to foam beads.

23. The process according to embodiment 22, wherein the pellet material in step (b) is impregnated in with 0.1% to 50% by weight of a blowing agent at a temperature in the range from 90 to 180° C. and a pressure in the range from 0.5 to 10 MPa.

24. A foamed pellet material obtained by a process according to any of embodiments 21 to 23.

25. The foamed pellet material according to embodiment 24, wherein the average diameter of the beads is in the range from 0.5 to 20 mm.

26. A molded article obtainable from a foamed pellet material according to either of embodiments 24 and 25.

27. A process for producing a molded article from a foamed pellet material according to either of embodiments 24 and 25, comprising steps (a) and (b):
   (a) introducing the expanded thermoplastic polyurethane beads into a mold;
   (b) contacting the expanded thermoplastic polyurethane beads introduced into the mold with steam, hot air or high-energy radiation, such that the expanded thermoplastic polyurethane beads melt at the surface and are welded to form the molding.

28. The foamed pellet material according to embodiment 19, wherein the average diameter of the beads is in the range from 0.5 to 20 mm.

29. A molded article obtainable from a foamed pellet material according to either of embodiments 19 and 28.

30. The use of a foamed bead material according to either of embodiments 19 and 28 for production of a molded article.

31. The use according to embodiment 30, wherein the molded article is produced by means of fusion or bonding of the beads to one another.

32. The use according to embodiment 30 or 31, wherein the molded article is a footwear sole, part of a footwear sole, a mattress, underlay, grip, protective film, a component in an automobile interior or exterior, a gymnastics mat, a body protector, a trim element in automobile construction, a sound insulator, a vibration damper, a cushion, a bicycle seat, a toy, a tire or part of a tire, or a covering for a track and field surface, a sports hall or a pathway, a damping layer or a damping core in a sandwich element, or a packaging.

33. The use of a foamed pellet material according to either of embodiments 19 and 28 in balls and sports equipment or as floor covering and wall paneling, especially for sports surfaces, track and field surfaces, sports halls, children's playgrounds and pathways.

34. A hybrid material comprising a matrix composed of a polymer (PM) and a foamed pellet material according to either of embodiments 19 and 28.

35. A process for producing a thermoplastic polyurethane, at least comprising steps (i) and (ii):
(i) converting at least one isocyanate composition (ZI) comprising an isocyanate (I1) selected from the group consisting of naphthylene 1,5-diisocyanate (NDI), p-phenyl diisocyanate (PPDI) and o-tolidine diisocyanate (TODI), ethylene diphenyl diisocyanate (EDI) or mixtures thereof and a polyol composition (ZP) comprising a polytetrahydrofuran or a derivative thereof to obtain a prepolymer having isocyanate groups,
(ii) reacting the prepolymer obtained in step (i) with at least one chain extender (KV).

36. The process according to embodiment 35, wherein the derivative of polytetrahydrofuran is a poly-ε-caprolactonepolyol.

37. The process according to either of embodiments 35 and 36, wherein further components used in the reaction in step (ii) are selected from the group consisting of polyols, chain extenders, catalysts, cell nucleators, other auxiliaries and additives.

38. The process according to any of embodiments 35 to 37, wherein the poly-ε-caprolactonepolyol is obtainable or obtained by reaction of ε-caprolactone and a starter molecule selected from the group consisting of α-hydro-ω-hydroxypoly(oxytetramethylene)diols.

39. The process according to any of embodiments 35 to 38, wherein the polyisocyanate composition comprises naphthylene 1,5-diisocyanate (NDI) in an amount in the range from 90% to 100% by weight, based on the overall polyisocyanate composition.

40. The process according to any of embodiments 35 to 39, wherein the chain extender (KV) is selected from the group consisting of diols having a molecular weight in the range from 50 to 500 g/mol and diamines having a molecular weight in the range from 50 to 500 g/mol.

41. The process according to any of embodiments 35 to 40, wherein the chain extender (KV) is selected from the group consisting of MEG, butane-1,4-diol, propane-1,3-diol, hexane-1,6-diol, 2-ethylhexane-1,3-diol or 2-butyl-2-ethylpropanediol.

42. A thermoplastic polyurethane obtainable or obtained by a process at least comprising steps (i) and (ii):
(i) converting at least one isocyanate composition (ZI) comprising an isocyanate (11) selected from the group consisting of naphthylene 1,5-diisocyanate (NDI), p-phenyl diisocyanate (PPDI) and o-tolidine diisocyanate (TODI), ethylene diphenyl diisocyanate (EDI) or mixtures thereof and a polyol composition (ZP) comprising a polytetrahydrofuran or a derivative thereof to obtain a prepolymer having isocyanate groups,
(ii) reacting the prepolymer obtained in step (i) with at least one chain extender (KV).

43. A foamed pellet material comprising a thermoplastic polyurethane obtainable or obtained by a process according to any of embodiments 35 to 41 or a thermoplastic polyurethane according to embodiment 42.

44. The foamed pellet material according to embodiment 43, wherein the average diameter of the beads is in the range from 0.5 to 20 mm.

45. A molded article obtainable from a foamed bead material according to either of embodiments 43 and 44.

46. The use of a foamed bead material according to either of embodiments 43 and 44 for production of a molded article.

47. The use according to embodiment 46, wherein the molded article is produced by means of fusion or bonding of the beads to one another.

48. The use according to embodiment 46 or 47, wherein the molded article is a footwear sole, part of a footwear sole, a mattress, underlay, grip, protective film, a component in an automobile interior or exterior, a gymnastics mat, a body protector, a trim element in automobile construction, a sound insulator, a vibration damper, a cushion, a bicycle seat, a toy, a tire or part of a tire, or a covering for a track and field surface, a sports hall or a pathway, a damping layer or a damping core in a sandwich element, or a packaging.

49. The use of a foamed pellet material according to either of embodiments 43 and 44 in balls and sports equipment or as floor covering and wall paneling, especially for sports surfaces, track and field surfaces, sports halls, children's playgrounds and pathways.

50. A hybrid material comprising a matrix composed of a polymer (PM) and a foamed pellet material according to either of embodiments 43 and 44.

51. A process for producing a thermoplastic polyurethane, at least comprising steps (i) and (ii):
i converting at least one isocyanate composition (ZI) comprising naphthylene diisocyanate (NDI) as isocyanate (II) and a polyol composition (ZP) comprising a polytetrahydrofuran or a derivative thereof to obtain a prepolymer having isocyanate groups, (ii) reacting the prepolymer obtained in step (i) with at least one chain extender (KV).

52. The process according to embodiment 51, wherein the derivative of polytetrahydrofuran is a poly-ε-caprolactonepolyol.

53. The process according to either of embodiments 51 and 52, wherein further components used in the reaction in step (ii) are selected from the group consisting of polyols, chain extenders, catalysts, cell nucleators, other auxiliaries and additives.

54. The process according to any of embodiments 51 to 53, wherein the poly-ε-caprolactonepolyol is obtainable or obtained by reaction of s-caprolactone and a starter molecule selected from the group consisting of α-hydro-ω-hydroxypoly(oxytetramethylene)diols.

55 The process according to any of embodiments 51 to 54, wherein the polyisocyanate composition comprises naphthylene 1,5-diisocyanate (NDI) in an amount in the range from 90% to 100% by weight, based on the overall polyisocyanate composition.

56. The process according to any of embodiments 51 to 55, wherein the chain extender (KV) is selected from the group consisting of diols having a molecular weight in the range from 50 to 500 g/mol and diamines having a molecular weight in the range from 50 to 500 g/mol.

57 The process according to any of embodiments 51 to 56, wherein the chain extender (KV) is selected from the group consisting of MEG, butane-1,4-diol, propane-1, 3-diol, hexane-1,6-diol, 2-ethylhexane-1,3-diol or 2-butyl-2-ethylpropanediol.

58. A thermoplastic polyurethane obtainable or obtained by a process at least comprising steps (i) and (ii):

(i) converting at least one isocyanate composition (ZI) comprising naphthylene diisocyanate (NDI) as isocyanate (II) and a polyol composition (ZP) comprising a polytetrahydrofuran or a derivative thereof to obtain a prepolymer having isocyanate groups, (ii) reacting the prepolymer obtained in step (i) with at least one chain extender (KV).

59. A foamed pellet material comprising a thermoplastic polyurethane obtainable or obtained by a process according to any of embodiments 51 to 57 or a thermoplastic polyurethane according to embodiment 58.

60. The foamed pellet material according to embodiment 59, wherein the average diameter of the beads is in the range from 0.5 to 20 mm.

61. A molded article obtainable from a foamed pellet material according to either of embodiments 59 and 60.

62. The use of a foamed pellet material according to either of embodiments 59 and 60 for production of a molded article.

63. The use according to embodiment 62, wherein the molded article is produced by means of fusion or bonding of the beads to one another.

64. The use according to embodiment 62 or 63, wherein the molded article is a footwear sole, part of a footwear sole, a mattress, underlay, grip, protective film, a component in an automobile interior or exterior, a gymnastics mat, a body protector, a trim element in automobile construction, a sound insulator, a vibration damper, a cushion, a bicycle seat, a toy, a tire or part of a tire, or a covering for a track and field surface, a sports hall or a pathway, a damping layer or a damping core in a sandwich element, or a packaging.

65. The use of a foamed pellet material according to either of embodiments 59 and 60 in balls and sports equipment or as floor covering and wall paneling, especially for sports surfaces, track and field surfaces, sports halls, children's playgrounds and pathways.

66. A hybrid material comprising a matrix composed of a polymer (PM) and a foamed pellet material according to either of embodiments 59 and 60.

The examples that follow serve to illustrate the invention, but are in no way limiting with respect to the subject matter of the present invention.

EXAMPLES

1. Production Examples for Thermoplastic Polyurethanes
1.1 Experiment 1 (TPU 1)

1000 parts by weight of polyol (PCL-capped PTHF (PCL500-PTHF1000-PCL500), PTHF2000 4:1) is heated to a temperature between 130-160° C., and 200 parts by weight of NDI is added in solid form and reacted. After a reaction time of 30-50 minutes within a temperature range of 150-90° C., a prepolymer having an NCO content of 3.2% and a viscosity of 2500 mPas is obtained at 90° C.

Within 2 h after production, 100 parts by weight of the prepolymer thus obtained was mixed homogeneously with 3.4 parts by weight of butane-1,4-diol at a temperature of 90° C. and introduced into a mold having, a mold temperature between 80-100° C.

After a curing time of 20-30 minutes, the material was subjected to heat treatment at a temperature of 110° C. for 14 h can the material obtained be processed further by injection molding.

The resultant TPU 1 was pelletized by means of a mill and transformed to lenticular granules via underwater pelletization by extrusion with a ZSK40 twin-screw extruder having a maximum zone temperature of 220° C. and a perforated plate temperature of 230° C. The TPU was then dried at 80° C. for 1.5 h.
1.2 Experiment 2 (TPU 2)

1000 parts by weight of polyol (PCL-capped PTHF, PTHF2000 4:1) is heated to a temperature between 130-160° C., and 200 parts by weight of NDI is added in solid form and reacted. After a reaction time of 30-50 minutes within a temperature range of 150-90° C., a prepolymer having an NCO content of 2.87% and a viscosity of 2960 mPas is obtained at 90° C.

Within 4 h after production, 100 parts by weight of the prepolymer thus obtained was mixed homogeneously with 2.73 parts by weight of a mixture consisting of 100 parts propane-1,3-diol and 5 parts of an amine catalyst mixture (65% N-methyl-N-dimethylaminoethylpiperazine and 35% pentamethyldiethylenetriamine) at a temperature of 90° C. and introduced into a mold having a mold temperature between 80-100° C.

After a curing time of 20-30 minutes, the material was subjected to heat treatment at a temperature of 110° C. for 14 h can the material obtained be processed further by injection molding.

In the subsequent reprocessing to give lenticular granules, talc was added at a concentration of 0.05%.
1.3 Determination Method for the NCO Content:
Solutions:

Di-n-hexylamine solution: 166.8 g of di-n-hexylamine is made up to 1.0 L with xylene (in a 1 L standard flask) and homogenized.

1% bromophenol blue solution: 0.5 g of bromophenol blue is dissolved in 49.5 g of ethanol and transferred into a pipette bottle.
Procedure:

10 mL of the amine solution is dispensed into an Erlenmeyer flask. Subsequently, 20 mL of chlorobenzene is added. For an expected isocyanate content of 4%, 2 g-2.5 g of prepolymer is weighed in accurately to 0.1 mg (the weights for other isocyanate concentrations have to be adjusted correspondingly). After complete dissolution (visual check), 50 mL of methanol is added. After addition of 3 drops of bromophenol blue solution, the unconsumed amine is then back-titrated with HCl (c=1.0 mol/L) until the color changes from blue to yellow.

The blank samples, i.e. samples containing no prepolymer, are treated in the same way—except without weighing out the sample, Calculation: NCO free=$(((V_{BLK}-V_{sample})*M*c*t)/m)*100\%$ with $V_{BLK}$=consumption of HCl (1.0 mol/L) for blank in L $V_{sample}$=consumption of HCl (1.0 mol/L) for sample in L M=molar mass of NCO 42.02 g/mol C=molar concentration of HCl 1.9 mol/L t=HCl titer (1.0 mol/L)

m=sample weight of prepolymer in g

1.4 Example 3 (TPU 3)—Reactive Extruder a. Example of Continuous Synthesis

NDI and any solid additives are fed into the first barrel of a ZSK32 MC, twin-screw extruder from Coperion with a processing length of 56D. The polyols that have been heated to 160° C., and also catalyst and any liquid additives, are fed into the molten NDI in the second barrel. After mixing and (partial) reaction of the components, the chain extender is added downstream, to the fifth zone. At barrel temperatures of 190-220° C., the reaction components are converted up to a conversion level of >95%. After the synthesis, the resulting polymer melt is subjected to underwater pelietization, and the resulting pellets are dried.

As a variation of the process specified above, all liquid components can also be added to zone 2.

The determination was in accordance with DIN EN ISO 60: 2.000-1. The foam beads are introduced here with the aid of a funnel having fixed geometry (completely filled with bulk material) into a measuring cylinder of known volume, the excess bulk material is leveled off from the measuring cylinder with a straight-edged bar, and the contents of the measuring cylinder are ascertained by weighing.

The funnel used is 40 cm high, and had an opening angle of 35° and an outlet of diameter 50 mm. The measuring cylinder used had an internal diameter of 188 mm and a volume of 10 L.

The bulk density (SD) was calculated from the mass of the bed of material [kg]/0.01 [m³].

The bulk density reported was the average from 3 measurements in kg/m³.

Average Cell Density

The foam structure was assessed by visual image analysis with a PORE!SCAN Advanced Plus from Goldlücke Ingenieurleistungen. For this purpose, 10 foam beads in each case are halved and a cross-sectional area of each is measured. In the case of nonspherical, for example elongated, cylindrical or ellipsoidal, foam beads, the division is in the direction of the longest dimension.

The average cell density is the ratio of the number of cells in the cross-sectional area to the cross-sectional area, and is reported in $1/mm^2$.

| | Sample A KZ 990 | Sample B KZ 960 |
|---|---|---|
| | Dosage rate g/min | |
| PolyTHF 2000, OHN = 56.0 mgKOH/g | 54.1 | 54.1 |
| CAPA 7201A, OHN = 56.4 mgKOH/g | 216.5 | 216.5 |
| Desmodur 15 | 53.1 | 51.5 |
| Propane-1,3-diol | 9.1 | 9.1 |
| TBOT | 75 ppm | 75 ppm |

| Sample | KZ | MFR (190° C./21.6 kg) | | | MFR (200° C./2.16 kg) | | |
|---|---|---|---|---|---|---|---|
| | | no heat treatment | 15 h/80° C. | 15 h/80° C. + 2 h/110° C. | MFR1 fresh | MFR1 15 h/80° C. | MFR1 15 h/80° C. + 2 h/110° C. |
| A | 990 | 6 | 4.9 | 1.9 | 130 | 72 | 58 |
| B | 960 | 28 | 4.7 | 5.3 | >250 | 171 | 167 |

2. Test Methods:

Test methods/indices used for characterization of the pellet materials used, and of the resulting foam beads and moldings, including the following:

a. Determination of Melting Point by DSC

Procedure to ISO 11357-3 (German version of Apr. 1, 2013) with DSC Q100 from TA Instruments. To determine the melting point of the thermoplastic elastomer used or of other thermoplastic elastomers of the invention, 3-5 mg in pellet form is heated up at a heating rate of 20° C./min in a 1st run between 20° C. and 200° C., then cooled down to 20° C. at 10° C./min, followed by a further heating cycle (2nd run) at a heating rate of 10° C./min. The melting point reported was the peak maximum temperature in the 2nd run.

b. Bulk Density

The value is assigned to a classification:

| Classification | Average cell density [$1/mm^2$] |
|---|---|
| F fine cells | >100 |
| N normal cells | 10-100 |
| G coarse cells | <10 | d. Densification Level VG

The densification level VG is the ratio of molding density (FT density) to bulk density (SD), VG=FT density [kg/m³]/SD [kg/m³].

e. Further Test Methods:

Further test methods utilized for material characterization may include the following: DMA, TMA, NMR, FT-IR, GPC

| Apparent density | DIN EN ISO 845: 2009 October |
| Tear propagation resistance | DIN LN ISO 8067: 2009 June |
| Dimensional stability | ISO 2796: 1986 August |
| Tensile test | ASTM D5035: 2011 |
| Resilience | DIN 53512: 2000 April |

3. Production of Foam Beads by Impregnation in an Autoclave

3.1 Starting Materials

For the E-TPU examples 1 to 7 (and the comparative examples), the following TPU materials were used:

| | Density (20 kg/m³) |
|---|---|
| TPU 1 in the form of lenticular pellets | 1150 kg/m³ |
| TPU 2 in the form of lenticular pellets | 1150 kg/m³ |

The experiments were conducted with a tank fill level of 80% and a phase ratio of 0.38. The phase ratio is defined here as the ratio of the masses of pellets to suspension medium, water in the examples.

3.2 General Production Method for Example E-TPU Example 1 to E-TPU Example 7

100 parts by weight (corresponding to 27.1% by weight, based on the overall suspension without blowing agent) of the pellets, 262 parts by weight (corresponding to 71.0% by weight, based on the overall suspension without blowing agent) of water, 6.7 parts by weight (corresponding to 1.8% by weight, based on the overall suspension without blowing agent) of calcium carbonate (suspension auxiliary), 0.13 part by weight (corresponding to 0.04% by weight, based on the overall suspension without blowing agent) of a surface-active substance (Lutensol AT 25; suspension auxiliary) and the appropriate amount of butane as blowing agent (based on the amount of pellets used) were heated while stirring.

Then nitrogen was additionally injected into the liquid phase at 50° C., and the internal pressure was adjusted to a predefined pressure (800 kPa). This is followed by expansion via an expansion device on attainment of the impregnation temperature (IMT) and optionally after observing a hold time (HZ) and at the impregnation pressure (IMP) established at the end. The gas space here is adjusted to a fixed expulsion pressure (AP) and kept constant during the expansion. The expansion jet downstream of the expansion device may optionally be cooled with a particular volume flow rate of water at a specific temperature (water quench).

The hold time defines the time at which the temperature of the liquid phase is within a temperature range from 5° C. below the impregnation temperature to 2° C. above the impregnation temperature.

After removal of the suspension medium/suspension auxiliary system (dispersant/surfactant) and drying, the bulk density (SD) of the resulting foam beads is measured.

The exact production parameters and bulk density of the resulting batches (foam beads) are listed in tables 1a and 1b.

TABLE 1a

| | | | Experimental parameters for examples 1 to 7 | | | |
|---|---|---|---|---|---|---|
| Example | Pellet type Bead geometry Bead mass [mg] | Blowing agent | Blowing agent content [% by wt.] | IMT [° C.] | Hold time [min] |
| E-TPU Example 1 | TPU1 UWP 30 | butane | 24.0 | 150.0 | 3 |

TABLE 1a-continued

| | | | Experimental parameters for examples 1 to 7 | | | |
|---|---|---|---|---|---|---|
| Example | Pellet type Bead geometry Bead mass [mg] | Blowing agent | Blowing agent content [% by wt.] | IMT [° C.] | Hold time [min] |
| E-TPU Example 2 | TPU1 UWP 30 | butane | 24.0 | 151.0 | 4 |
| E-TPU Example 3 | TPU2 UWP 34 | butane | 24.0 | 115 | 3 |
| E-TPU Example 4 | TPU2 UWP 34 | butane | 24.0 | 120 | 3 |
| E-TPU Example 5 | TPU2 UWP 34 | butane | 24.0 | 115 | 22 |
| E-TPU Example 6 | TPU2 UWP 34 | butane | 24.0 | 116 | 22 |
| E-TPU Example 7 | TPU2 UWP 34 | butane | 24.0 | 117 | 20 |

TABLE 1b

| | | Experimental parameters for examples 1 to 7 | | | |
|---|---|---|---|---|---|
| Example | IMP [kPa] | Expulsion pressure [kPa] | Water quench | Bulk density SD [kg/m³] | Average cell density Classification |
| E-TPU Example 1 | 3130 | 4000 | yes | 122 | F[1] |
| E-TPU Example 2 | 3120 | 4000 | yes | 119 | F[1] |
| E-TPU Example 3 | 2570 | 4000 | no | 189 | F |
| E-TPU Example 4 | 2780 | 4000 | no | 152 | F |
| E-TPU Example 5 | 2380 | 4000 | no | 152 | F |
| E-TPU Example 6 | 2420 | 4000 | no | 147 | F |
| E-TPU Example 7 | 2570 | 4000 | no | 150 | F |

[1]Cell structure of the foamed pellet material contains bubbles and cracks

4. Production of Moldings

The foam beads (expanded pellets) were subsequently welded in a molding machine from Kurtz Ersa GmbH (Energy Foamer K68) to give square plaques having a side length of 200 mm and a thickness of 10 mm and 20 mm, or in a molding machine from Erlenbach (EHV-C870/670) rectangular plaques having a side length of 300×200 mm and a thickness of 10 mm, by contacting with steam.

The moldings can be produced by the pressure filling method or by the crack filling method. For the inventive examples, the crack filling method was used (see table 2).

After the production, the moldings were stored at 60° C. to 70° C. for 4 to 16 h and then the molding density was tested (table 2).

TABLE 2

Steam pressures and times for welding of the materials
from the examples and comparative examples

| Mold-ing | E-TPU/ ex. | Crack [mm] | Cross-steam 1 Time/ pressure [s] [bar] | Cross-steam 2 Time/ pressure [s] [bar] | Autoclave steam Time/ pressure [s] [bar] | Total cooling time [s] | Mold-ing thick-ness [mm] | mold-ing density [kg/m³] |
|---|---|---|---|---|---|---|---|---|
| FT 1 | 1 | 10.0 | 4/4.0 | 7/4.0 | 32/4.0 | 30 | 10 | KV |
| FT 2 | 3 | 8.0 | 4/2.5 | 7/2.5 | 32/2.5 | 96 | 10 | 399 |
| FT 3 | 5 | 10.0 | 4/2.5 | 7/2.5 | 32/2.5 | 68 | 10 | 373 |
| FT 4 | 4 | 8.0 | 4/2.5 | 7/7.5 | 32/2.5 | 77 | 10 | 326 |
| FT 5 | 7 | 8.0 | 4/2.7 | 7/2.7 | 32/2.7 | 73 | 10 | 326 |
| FT 6 | 7 | 5.0 | 4/2.5 | 7/2.5 | 32/2.5 | 30 | 10 | 296 |
| FT 7 | 7 | 14.0 | 10/0.7 | 20/2.9 | 32/2.9 | 100 | 10 | n.d. |
| FT 8 | 7 | 22.0 | 10/0.7 | 20/2.9 | 32/2.9 | 120 | 20 | 429 |

KV no welding/no FT production possible,
n.d. not determined

The results of the mold tests are listed in table 3.

TABLE 3

| Molding | Pendulum rebound resilience [%] DIN 53512 | Tensile strength [kPa] ASTM D 5035 | Elongation at break [%] | Compressive strength (at 10% compression) [kPa] ISO 844 | Compressive strength (at 50% compression) [kPa] |
|---|---|---|---|---|---|
| FT2 | 79.7 | 1534 | 157 | 99 | 841 |
| FT3 | 79.1 | 1476 | 165 | 84 | 677 |
| FT4 | 79.1 | 1486 | 187 | 68 | 503 |
| FT5 | 78.7 | 1442 | 200 | 63 | 501 |
| FT6 | 78.7 | 1105 | 165 | 35 | 421 |
| FT 8 | 79.0 | n.d. | n.d. | n.d. | n.d. | n.d. not determined

5. Examples for Production of Hybrid Materials
5.1 General Production Procedure for Hybrid Material The beads produced above were used to produce moldings by means of a PU system or binder. For this purpose, first of all, the liquid formulations were prepared and these were then mixed vigorously with the beads in a plastic vessel made of polyethylene, before they were discharged into the molds. The mold used was a Teflon-coated wooden mold having internal dimensions of 4.5×4.5×4.5 cm. By means of an inlay of 4.5×4.5×2.5 cm, it was possible to produce either cubes or slabs of thickness 2 cm from the formulations.
5.2 Starting Materials Beads used: E-TPU1
5.3 Foam System and Binder

| | A comp. 94 parts | | | | |
|---|---|---|---|---|---|
| Name | Parts | Wt. [%] | Wt. [g] | OH/NH | H2O [%] |
| PolyTHF 2000 | 67.000 | 67.000 | 670.000 | 56.0 | 0.015 |
| Rizinusoel DAB 10 Spezial | 21.000 | 21.000 | 210.000 | 160.5 | 0.030 |

-continued

| | | | | | |
|---|---|---|---|---|---|
| MONOETHYLENE GLYCOL TECH. | 4.600 | 4.600 | 46.000 | 1,810.0 | 0.200 |
| TINUVIN 213 | 3.000 | 3.000 | 30.000 | 180.0 | 0.040 |
| TEGOSTAB B8462 | 2.000 | 2.000 | 20.000 | 115.0 | 0.200 |
| Mullopol Fin | 2.000 | 2.000 | 20.000 | 0.0 | 50.000 |
| 1-Methylimidazole | 0.400 | 0.400 | 4.000 | 4.0 | 0.500 |

| B comp. 100 parts Iso137/28 (NCO [%] 18.00) | |
|---|---|
| Name | Amount |
| 4,4' MDI | 61.4 |
| Carbodiimide-modified MDI | 2 |
| Antioxidant | 0.09 |
| Diglycol bis(chloroformate) | 0.01 |
| Polyol mixture of 89.05% polypropylene glycol Mw2000 and 10.95% tripropylene glycol | 36.5 |

5.4 Gel system

| | A comp. 94 parts | | | |
|---|---|---|---|---|
| Name Parts Wt. [% | | Wt. [g] | OH/NH | H2O [%] |
| PolyTHF 2000 67.000 67.000 | | 670.000 | 56.0 | 0.015 |
| Rizinusoel DAB 10 Spezial 21.000 21.000 | | 210.000 | 160.5 | 0.030 |

-continued

| | | | | |
|---|---|---|---|---|
| MONOETHYLENE GLYCOL TECH. 4.600 4.600 | 46.000 | 1,810.0 | 0.200 | |
| TINUVIN 213 3.000 3.000 | 30.000 | 180.0 | 0.040 | |
| TEGOSTAB B8462 2.000 2.000 | 20.000 | 115.0 | 0.200 | |
| Mullopol Fin 2.000 2.000 | 20.000 | 0.0 | 50.000 | |
| 1-Methylimidazole 0.400 0.400 | 4.000 | 4.0 | 0.500 | |

B comp.
100 parts Iso137/28 (NCO [%] 18.00)

| Name | Amount |
|---|---|
| Name Amount | 61.4 |
| 4,4' MDI 61.4 | 2 |
| Carbodiimide-modified MDI 2 | 0.09 |
| Antioxidant 0.09 | 0.01 |
| Diglycol bis(chloroformate) 0.01 | |
| Polyol mixture of | |
| 89.05% polypropylene glycol | 36.5 |
| 36.5 | |
| Mw2000 and 10.95% tripropylene | |
| glycol | |

A comp.
100 parts

| Name | % by wt. |
|---|---|
| Propylene glycol-started PO-EO ether of functionality 1.76 and Mw 3410 | 97.847 |
| Dipropylene glycol monomethyl ether | 1.761 |
| Coscat 83 | 0.391 |

B comp.
11 parts

| Name | % by wt. |
|---|---|
| Trimerized hexamethylene diisocyanate | 100 |

5.5 Results

| Experiment | % by wt. of beads | % by wt. of system | % by wt. of water | % by wt. of gel system | Component density (kg/m³) | Resilience (5) |
|---|---|---|---|---|---|---|
| 1 | 40 | 60 | 1 | | 300 | 77 |
| 2 | 50 | 50 | 1 | | 300 | 77 |
| 3 | 50 | 50 | 1 | | 220 | 75 |
| 4 | 40 | 60 | 2 | | 760 | 71 |
| 5 | 50 | 50 | 2 | | 260 | 74 |
| 6 | 80 | 20 | 0 | | 260 | 73 |

-continued

| Experiment | % by wt. of beads | % by wt. of system | % by wt. of water | % by wt. of gel system | Component density (kg/m³) | Resilience (5) |
|---|---|---|---|---|---|---|
| 7 | 33 | | | 67 | 390 | 78 |
| 8 | 40 | | | 60 | 360 | 78 |

6. Production of eTPU/PU Foam Hybrid Sheets

With the aid of a dosage machine (4K TPY NDF 20-4 low-pressure machine from Elastogran GmbH), component A that had been preheated to 40° C. and component B that had been preheated to 25° C., with the composition listed in table 4, were added at a pressure of 16 bar under time control in accordance with the details from table 4 to the appropriate amount of E-TPU that was in a 27 L plastic beaker.

TABLE 4

Composition of the A and B component

| | PU foam 1 | PU foam 2 | PU foam 3 | PU foam 4 |
|---|---|---|---|---|
| PTHF Mn 2000 g/mol [% by wt.] | 98.6 | 98.6 | 98.674 | 96.770 |
| Deionized water [% by wt.] | 1 | 2 | 0.663 | 0.65 |
| Diethanolamine [% by wt.] | 0.1 | 0.1 | 0.102 | 0.3 |
| A 33% solution of triethylenediamine in monoethylene glycol (Lupragen N 203) [% by wt.] | 0.2 | 0.2 | 0.204 | 1.4 |

TABLE 4-continued

| Composition of the A and B component | | | | |
|---|---|---|---|---|
| | PU foam 1 | PU foam 2 | PU foam 3 | PU foam 4 |
| DABCO 1027 [% by wt.] | 0.1 | 0.1 | 0.102 | 0.63 |
| Prepolymer based on 40% by weight of PTHF2000, 53.98% by weight of MDI (Lupranat ME), 6% by weight of a carbodiimide-modified MDI having an average functionality of 2.2 (Lupranat MM103) and 0.02% by weight of diglycol bis(chloroformate) having a residual NCO content of 18% [% by weight] | 100 | 100 | | |
| Tegostab B 8491 | | | 0.153 | 0.150 |
| Bis(2-dimethylaminoethyl) ether | | | 0.102 | 0.1 |
| Iso 137/53 | | | 100 | 100 |

The dosage parameters derive from the fact that a loss of about 10% of the total mass of the foam system remains in the mixing and transferring of E-TPU and foam. This is checked by the weighing of the finished test sheets that had been adjusted to a density of 300 (PU foam 1) or 260 kg/m³ (PU foam 2).

Before the test sheets were tested, they were stored at room temperature for at least 2 days in order to ensure that the PU foam had reacted to completion. Resilience (also referred to as rebound) according to DIN 53512: 2000-04 and the densities according to DIN EN ISO 845: 2009-10 of the resultant 20 mm sheets are listed in table

TABLE 5

| Time-dependent dosages of the dosage machine used (E-TPU 1) | | | | | | | | | |
|---|---|---|---|---|---|---|---|---|---|
| | | | | Sheet of thickness 20 mm (210 g) | | | Sheet of thickness 10 mm (105 g) | | |
| Name | E-TPU | PU foam | Proportion of E-TPU [% by wt.] | Mass of E-TPU [g] | PU foam [g] | Dosage time [s] | Mass of E-TPU [g] | PU foam [g] | Dosage time [s] |
| Hybrid 1 | E-TPU 1 | PU foam 1 | 40 | 84 | 138 | 2.61 | 42 | 73 | 1.44 |
| Hybrid 2 | E-IPU 1 | PU foam 1 | 50 | 105 | 115 | 2.2 | 53 | 58 | 1.15 |
| Hybrid 3 | E-TPU 1 | PU foam 2 | 40 | 84 | 138 | 2.61 | 42 | 73 | 1.44 |
| Hybrid 4 | E-TPU 1 | PU foam 2 | 50 | 105 | 115 | 2.2 | 53 | 58 | 1.15 |

Immediately thereafter, the components and the E-TPU were immediately mixed with the aid of a laboratory stirrer (EWTHV-05 type from Vollrath GmbH) for a maximum of 10 s and then introduced and distributed homogeneously with a wooden spatula into an open aluminum mold having the dimensions of 20×20×1 cm or 20×20×2 cm that had been preheated to 45° C. and painted with silicone (marbo super release s) until the gel time of about 40 s had been attained. The aluminum mold was heated using an SC 100 heating device from Thermo Scientific.

After the mold has been closed, the system reacts to completion for 30 min. The ventilation of the mold is controlled here by ventilation channels, while the mold temperature is kept constant at 45° C.

TABLE 6

| Measured densities and resilience of the hybrid sheets obtained | | |
|---|---|---|
| Name | Density [kg/m³] | Resilience [%] |
| Hybrid 1 | 300 | 77 |
| Hybrid 2 | 300 | 77 |
| Hybrid 3 | 260 | 71 |
| Hybrid 4 | 260 | 74 |

By a low level of catalysis, PU foam 3 was processed in the same procedure as foams 1 and 2, and a proportion of 70% bead mass was introduced. PU foam 4, owing to the faster reaction time, was introduced directly into an E-TPU-filled mold and subsequently forms a foam around it. The completely filled mold permits a proportion of about 50% of the bead mass. The faster-reacting system achieves a demolding time of about 5 min. All other processing parameters are maintained.

The mechanical test data that follow were ascertained on the test sheets of thickness 20 mm.

TABLE 7

Test results for the hybrid sheets PU foam 3 and 4

| | | | Apparent density [kg/m$^3$] | Tear propagation resistance [N/mm] | Change in length [%] | Change in height [%] | Resilience [%] |
|---|---|---|---|---|---|---|---|
| | PU foam 4 | pure | 301 | 1.7 | −1.7 | 1.9 | 66 |
| Hybrid 5 | PU foam 4 | 50% eTPU 1 | 285 | 3.3 | −0.2 | 6.1 | 71 |
| | PU foam 3 | pure | 307 | 2.9 | −0.9 | −0.2 | 52 |
| Hybrid 6 | PU foam 3 | 70% eTPU 1 | 274 | 3.2 | −0.2 | 6.5 | 69 |

LITERATURE CITED

WO 94/20568 A1
WO 2007/082838 A1
WO 2017/030835 A1
WO 2013/153190 A1
WO 2010/010010 A1
"Kunststoffhandbuch", volume 7, "Polyurethane", Cad Hanser Verlag, 3rd edition, 1993, chapter 3.1
Saechtling (ed.), Kunststott-Taschenbuch, 27th edition, Hanser-Verlag Munich 1998, chapters 3.2.1 and 3.2.4
WO 2014/150122 A1
WO 2014/150124 A1
EP 1979401B1
US 20150337102 A1
EP 2872309B1
EP 3053732 A
WO 2016/146537 A1
"Kunststoffhandbuch", volume 7, "Polyurethane" Carl Hanser Verlag, 3rd edition, 1993 chapter 3
"Integralschaumstoff", Carl-Hanser-Verlag, Munich, Vienna, 1975, or in Kunststoff-Handbuch, volume 7, Polyurethane, 3rd edition, 1993, chapter 7

The invention claimed is:

1. A foamed pellet material, comprising a thermoplastic polyurethane obtainable or obtained by a process comprising at least:

(i) converting one isocyanate composition (ZI), comprising an isocyanate (I1) selected from the group consisting of naphthylene 1,5-diisocyanate (NDI), diphenylmethane 4,4'-diisocyanate (MDI), p-phenyl diisocyanate (PPDI), o-tolidine diisocyanate (TODI), ethylene diphenyl diisocyanate (EDI), and a mixture thereof; and a polyol composition (ZP); to obtain a prepolymer having isocyanate groups, and (ii) reacting the prepolymer obtained in (i) with at least one chain extender (KV), wherein the polyol composition (ZP) comprises a poly-ε-caprolactonepolyol, wherein the polyol composition (ZP) comprises polytetrahydrofuran and a derivative thereof, wherein the derivative is a poly-ε-caprolactonepolyol obtained by reaction of ε-caprolactone and a polytetrahydrofuran as starter molecule.

2. The foamed pellet material according to claim 1, wherein the at least one isocyanate composition (ZI) comprises naphthylene 1,5-diisocyanate (NDI) in an amount in the range from 90% to 100% by weight, based on the one isocyanate composition (ZI).

3. The foamed pellet material according to claim 1, wherein the at least one chain extender (KV) is selected from the group consisting of diols having a molecular weight in the range from 50 to 500 g/mol and diamines having a molecular weight in the range from 50 to 500 g/mol.

4. The foamed pellet material according to claim 1, wherein the at least one chain extender (KV) is selected from the group consisting of monoethylene glycol, butane-1,4-diol, propane-1,3-diol, hexane-1,6-diol, 2-ethylhexane-1,3-diol, and 2-butyl-2-ethylpropanediol.

5. The foamed pellet material according to claim 1, wherein an average diameter of a bead of the foamed pellet material is in the range from 0.5 to 20 mm.

6. A molded article, obtainable from the foamed pellet material according to claim 1.

7. A method, comprising:
molding the foamed pellet material according to claim 1, to produce a molded article.

8. The method according to claim 7, wherein the molded article is produced by fusing or bonding of beads of the foamed pellet material to one another.

9. The method according to claim 7, wherein the molded article is a footwear sole, part of a footwear sole, a mattress, underlay, grip, protective film, a component in an automobile interior or exterior, a gymnastics mat, a body protector, a trim element in automobile construction, a sound insulator, a vibration damper, a cushion, a bicycle seat, a toy, a tire, a part of a tire, a covering for a track and field surface, a sports hall, a pathway, a damping layer or a damping core in a sandwich element, or a packaging.

10. A molded article, comprising the foamed pellet material according to claim 1, wherein the molded article is selected from the group consisting of a ball, sports equipment, floor covering, wall paneling, a sports surface, a track and field surface, a sports hall, a children's playground, and a pathway.

11. A hybrid material, comprising a matrix composed of a polymer (PM) and the foamed pellet material according to claim 1.

12. The foamed pellet material according to claim 1, wherein the thermoplastic polyurethane is obtained by the recited process.

13. The foamed pellet material according to claim 1, wherein the at least one chain extender (KV) is butane-1,4-diol.

14. The foamed pellet material according to claim 1, wherein the at least one chain extender (KV) is propane-1,3-diol.

15. The foamed pellet material according to claim 13, wherein the one isocyanate composition (ZI) comprises naphthylene 1,5-diisocyanate (NDI) in an amount in the range from 90% to 100% by weight, based on the one isocyanate composition (ZI).

16. The foamed pellet material according to claim 14, wherein the one isocyanate composition (ZI) comprises naphthylene 1,5-diisocyanate (NDI) in an amount in the range from 90% to 100% by weight, based on the one isocyanate composition (ZI).

\* \* \* \* \*